United States Patent
Akita et al.

(10) Patent No.: US 7,362,956 B2
(45) Date of Patent: Apr. 22, 2008

(54) APPARATUS FOR PLAYING BACK A VIDEO CONTENT STORAGE MEDIUM

(75) Inventors: Koji Akita, Iwaki (JP); Tetsuya Kishi, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 941 days.

(21) Appl. No.: 10/393,446

(22) Filed: Mar. 20, 2003

(65) Prior Publication Data
US 2004/0234242 A1    Nov. 25, 2004

(30) Foreign Application Priority Data
Mar. 25, 2002 (JP) .............................. 2002-082549
Feb. 18, 2003 (JP) .............................. 2003-039442

(51) Int. Cl.
*H04N 5/91* (2006.01)
(52) U.S. Cl. ........................................ 386/96; 386/126
(58) Field of Classification Search ................ 386/46, 386/95, 96, 98, 125, 126
See application file for complete search history.

(56) References Cited

U.S. PATENT DOCUMENTS 5,630,006 A * 5/1997 Hirayama et al. ............ 386/92
5,880,768 A * 3/1999 Lemmons et al. ............ 725/41
6,064,385 A   5/2000 Sturgeon et al.
2004/0179810 A1* 9/2004 Haussmann et al. .......... 386/46

FOREIGN PATENT DOCUMENTS

| JP | 2000-156023 | 2/2000 |
|----|-------------|--------|
| JP | 2001-052418 | 2/2001 |
| JP | 2002-016850 | 3/2002 |
| JP | 2002-074913 | 3/2002 |

* cited by examiner

*Primary Examiner*—Huy Nguyen
(74) *Attorney, Agent, or Firm*—Brinks Hofer Gilson & Lione

(57) ABSTRACT

An apparatus is capable of playing back video content recorded on a DVD-Video disk without requiring the playing of a menu. A presentation sequence control unit of a non-video navigation manager extracts button commands for playing titles from a VMGM-PG for displaying a title menu defined for a DVD-Video disk. The presentation sequence control unit selects the extracted button commands in a predetermined order and requests a navigation control unit to play titles indicated by the button commands. The navigation control unit controls a presentation engine to reproduce audio data of the titles in accordance with VTS-PGCs for playing back titles and to provide the reproduced audio data through an audio output device.

19 Claims, 23 Drawing Sheets

FIG. 13A

TITLE MENU TABLE

| TITLE 1 | JUMP TT (TTN=1) | PTT MENU FLAG=0 | PLAYBACK TIME |
|---|---|---|---|
| TITLE 2 | JUMP TT (TTN=2) | PTT MENU FLAG=1 | PLAYBACK TIME |
| : | : | : | : |
| TITLE n | : | PTT MENU FLAG=1 | PLAYBACK TIME |

FIG. 13B

PTT MENU TABLE

| TITLE 1 | JUMP VTS PTT (PTTN=1 VTS TTN=1) | PLAYBACK TIME |
|---|---|---|
| | JUMP VTS PTT (PTTN=1 VTS TTN=1) | PLAYBACK TIME |
| | : | : |
| | JUMP VTS PTT (PTTN=1 VTS TTN=1) | PLAYBACK TIME |
| TITLE 2 | : | : |
| : | : | : |
| TITLE n | : | : |

FIG. 15

TITLE ELEMENT TABLE

| TITLE 1 | PG/PGC | PLAYBACK TIME |
|---------|--------|---------------|
|         | PG/PGC | PLAYBACK TIME |
|         | ⋮      | ⋮             |
|         | PG/PGC | PLAYBACK TIME |
| TITLE 2 | ⋮      | ⋮             |
| ⋮       | ⋮      | ⋮             |
| TITLE n | ⋮      | ⋮             |

APPARATUS FOR PLAYING BACK A VIDEO CONTENT STORAGE MEDIUM

BACKGROUND OF THE INVENTION

1. Field of the Invention

The present invention relates to a technique of controlling a playback operation of a DVD-Video disk.

2. Description of the Related Art

In the art, a DVD-Video player is known as an apparatus for playing back a DVD-Video disk on which video content is recorded, and a DVD-Audio player is known as an apparatus for playing back a DVD-Audio disk on which audio content is recorded.

The DVD-Video disk refers to a storage medium on which content has been recorded in accordance with the DVD-Video standard, and the DVD-Audio disk refers to a storage medium on which content has been recorded in accordance with the DVD-Audio standard. The DVD-Video standard and the DVD-Audio standard are similar in the physical specifications and the file format specifications. However, there is some difference between them in the application specifications, although the application specifications are also similar in many parts to achieve maximum possible compatibility between them.

The DVD-Audio disk is allowed to include not only audio content but also video content. When video content is recorded on a DVD-Audio disk, it is recorded in a format which allows a DVD-Video player to play it back. An audio part of video content recorded on a DVD-Audio disk can be played back by a DVD-Audio player.

FIG. 24 shows the manner in which video presentation data and audio presentation data are recorded on a DVD-Audio disk.

Each DVD-Audio disk has a video zone and an audio zone. In the audio zone, the audio content, as denoted by AUDIO in FIG. 24, is stored according to the DVD-Audio standard. In the video zone, the video content is stored according to a standard which is based on the DVD-Video standard but which has some restrictions (a subset of the DVD-Video standard), as denoted by VIDEO in FIG. 24.

This allows DVD-Video players to play back video content stored, according to the subset of the DVD-Video standard, in the video zone of a DVD-Audio disk. The video content refers to content including a moving picture and sound/voice.

The video content is constructed in the following format. That is, each video content includes one or more video titles (VTTs), each of which includes one or more program chains (PGCs), wherein each PGC defines the order in which to play back one or more programs PG. Each PG includes one or more video title set (VTS) cells each of which includes one or more video object set units (VOBUs), wherein each VOBU includes moving image data (V-packs) and audio data (A-packs)

The DVD-Video player controls the order in which PGCs are played back and plays back PGs in the order defined by each PGC, thereby playing back video content including moving picture data and audio data in units of video titles or in other units.

On the other hand, the audio content is constructed in the following format. That is, each audio content includes one or more audio titles (AOTTs) and no or one or more audio with video titles (AVTTs)

Each AOTT includes one or more program chains (PGCs) each of which defines the order in which programs are played back. PGs in each AOTT can be of one of two types described below.

One PG type is a PG including one or more audio title set (ATS) cells each of which includes one or more audio object set units (AOBUs), wherein each AOBU includes audio data (A-packs). When PGs of this type are played back, audio data of A-packs in AOBUs of ATS cells are played back.

The other PG type is a PG which does not include ATS cells but which includes pointers pointing to VTS cells in a video zone. When this type of PG is played back, audio data of A-packs of VOBUs of VTS cells pointed to by the pointers are played back.

Each AVTT includes one or more PGCs each of which defines the order in which one or more PGs are played back. Each PG in an AVTT points to a VTS cell in the video zone. When a PG of this type is played back, moving image data (V-packs) and audio data (A-packs) in VOBUs of the VTS cell pointed to by the PG are played back. However, to play back the moving image data in AVTTs by a DVD-Audio player, the DVD-Audio player needs to have a capability of playing back video data.

In each audio content, a group Gr including one or more AOTTs and tracks corresponding to PGs are defined. The DVD-Audio player plays back audio data in AOTTs or AVTTs by playing back PGs in PGCs or playing back PGs corresponding to tracks in a Gr specified by a user. In the case in which the DVD-Audio player has the capability of playing back video data, moving image data and audio data in AVTTs can also be played back by playing back PGs in accordance with respective PGCs or by playing back PGs corresponding to groups or tracks specified by a user.

As described above, a DVD-Audio disk is allowed to include video content, according to the DVD-Video standard, in the video zone thereof, and audio data in the video zone can be played back by DVD-Audio players. However, if audio data of the video content recorded on a DVD-Video disk according to the DVD-Video standard is attempted to be played back using a DVD-Audio player, which does not have the capability of playing back video data, in a similar manner to the manner in which audio data recorded in the video zone of a DVD-Audio disk is played back, the following problems can occur.

That is, in the DVD-Video standard, it is allowed to define a menu with a combination of moving picture data, still picture data, and button data so that when a DVD-Video disk is played back, the menu is displayed in accordance with the definition described on the DVD-Video disk so as to prompt a user to enter an operation command on the menu. In some cases, when a DVD-Video disk is used, displaying such a menu and a user operation on the menu are indispensable to starting playback and/or continuing playback. For example, in the case of a DVD-Video disk including definition information indicating that a title menu should first be displayed after playback of the DVD-Video disk is started and a title specified by a user should be performed, it is required that the user should first select a title on the title menu to use the DVD-Video disk.

However, DVD-Audio players according to the DVD-Audio standard do not have the capability of displaying such a menu and receiving a selection command from the menu. DVD-Audio players cannot even display a menu including moving picture data, unless the DVD-Audio players have the capability of playing back video data. In many cases, DVD-Audio players dedicated to playing back DVD-Audio disks do not even have a display capable of displaying such a menu.

Therefore, for DVD-Audio players which do not have the capability of displaying a menu, it is often impossible to play back audio data recorded on a DVD-Video disk.

When a user tries to play back only audio data recorded on a DVD-Video disk by a DVD-Video player, if a menu cannot be displayed, as in the case in which no display is connected to the DVD-Video player or the display connected to the DVD-Video player does not satisfy necessary specifications, it is impossible to play back audio data.

Even when a user tries to play back a DVD-Video disk in a situation in which a menu can be correctly displayed on a display connected to a DVD-Video player, if users do not know how to handle the DVD-Video player, which may occur when users are very young or very old, or if users cannot understand a menu, which may occur when the menu is displayed in a foreign language the users cannot understand, the DVD-Video disk cannot be played back. Also, in a case in which a user cannot operate a menu for some reason, a DVD-Video disk cannot be played back.

The above-described problems occur not only in DVD-Video disks, but similar problems can occur when using a storage medium according to any standard which requires displaying a menu or the like and performing a selection operation on the menu to start and/or continue playing.

SUMMARY OF THE INVENTION

Thus, it is an object of the present invention to provide a playback apparatus capable of playing back a content such as audio content or video content recorded on a storage medium without requiring the display of a menu or the like and without requiring a user operation on the menu, even in a case in which displaying of the menu or the like and a user operation on the menu are assumed to be indispensable to starting and/or continuing playback.

It is another object of the present invention to provide a DVD-Audio player capable of playing back audio data recorded on a DVD-Video disk without requiring the display of a menu or the like and without requiring a user operation on the menu.

It is still another object of the present invention to provide a DVD-Video player capable of playing back a DVD-Video disk without requiring display of a menu or the like and without requiring a user operation on the menu.

According to an aspect of the present invention, to achieve the above objects, there is provided a playback apparatus for a storage medium on which video content and menu information are stored, the video content including a set of playback data units each including audio data and moving picture data, the menu information defining a menu intended to be displayed so as to prompt a user to select a playback data unit to be played back, the playback apparatus comprising a playback data unit selector for selecting a playback data unit to be played back from the playback data units stored on the storage medium, without receiving a selection command issued by a user in a situation in which the selection command is expected to be issued by the user; and a player unit for playing back at least audio data of the selected playback data unit including audio data and moving picture data.

In this playback apparatus, playback data units to be played back can be selected without requiring the display of a menu and/or without requiring a selection operation on the menu by a user. Therefore, even in a case in which a user operation is assumed to be necessary to start or continue a playback operation, it is possible to play back content recorded on a storage medium without requiring the user operation. Furthermore, even in a case in which a menu includes an image such as a moving picture or a still image, it is possible to play back at least audio data, of audio data and moving picture data, recorded on a storage medium without requiring video data playback capability.

More specifically, in the playback apparatus for playing back a video content storage medium, the playback data unit selector may select the playback data unit to be played back by extracting the menu information, analyzing the extracted menu information, and selecting a playback data unit to be played back from user-selectable playback data units defined, by the menu information, on the menu.

By performing playback operations on the basis of menu information in the above-described manner, it becomes possible to play back contents in a manner nearly similar to that intended by the provider of the content.

Furthermore, in this playback apparatus for playing back a video content storage medium, in a case in which the menu information defining the displayed menu includes still information indicating that the menu should be endlessly displayed in the form of a still image unless a user operation on the menu is performed, the playback data unit selector may analyze the menu information defining the displayed menu and may select a playback data unit to be played back from user-selectable playback data units included in the menu defined by the menu information. In a case in which the menu information defining the displayed menu includes loop information indicating that displaying of the menu should be endlessly repeated unless user operation on the menu is performed, the playback data unit selector may analyze the menu information defining the displayed menu and may select a playback data unit to be played back from user-selectable playback data units included in the menu defined by the menu information.

This makes it possible to play back content in a manner intended by the provider of the content in general situations and automatically select a playback data unit to be played back only in a situation in which a user operation on a menu is assumed to be necessary.

The playback apparatus for playing back a video content storage medium may further include a playback order rule setting unit for setting a playback order rule as specified by a user into one of the following modes: a mode in which the playback data units are played in the same order as the order in which the playback data units are recorded; a mode in which the playback data units are played in order of increasing playback times; and a mode in which the playback data units are played in a random order, wherein the playback data unit selector may sequentially select the playback data units to be played back, according to the determined playback order rule. This makes it possible to play playback data units in an order determined depending on the playback data units themselves or depending on the preferences of a user. For example, in a case in which content is of live music video or of sport video such as baseball, it is desirable to play playback data units in the same order as that in which the content is recorded. On the other hand, in a case in which the main content is of movie video or the like, it is desirable to play playback data units in the order of decreasing playback time to play the main content at the beginning. A random playback order may be desirable for karaoke (sing-along) video or the like.

The playback apparatus for playing back a video content medium may be a DVD-Audio player for playing back a DVD-Audio disk. In this case, the playback data unit selector may select the playback data units to be played back in such a manner that if a DVD-Video disk is mounted on the playback apparatus, title menu information defining a title menu intended to be displayed to prompt a user to select a title to be played is extracted as the menu information from the DVD-Video disk, the extracted title menu information is analyzed to detect titles selectable on the title menu by the user, and the detected titles are selected as the playback data units to be played back, and the player unit may perform the playback operation in such a manner that in a case in which a DVD-Audio disk is mounted on the playback apparatus, the player unit plays back audio data recorded on the mounted DVD-Audio disk, while in a case in which a DVD-Video disk is mounted on the playback apparatus, the player unit extracts audio data from the selected playback data units including audio data and moving picture data and plays back only the extracted audio data.

Alternatively, the playback data unit selector may select the playback data units to be played back in such a manner that if a DVD-Video disk is mounted on the playback apparatus, part-of-title menu information defining a part-of-title menu intended to be displayed to prompt a user to select a chapter to be played is extracted as the menu information from the DVD-Video disk, the extracted part-of-title menu information is analyzed to detect chapters selectable on the part-of-title menu by the user, and the detected chapters are selected as the playback data units to be played back, and the player unit may perform the playback operation in such a manner that in a case in which a DVD-Audio disk is mounted on the playback apparatus, the player unit plays back audio data recorded on the mounted DVD-Audio disk, while in a case in which a DVD-Video disk is mounted on the playback apparatus, the player unit extracts audio data from the selected playback data units including audio data and moving picture data and plays back only the extracted audio data.

Alternatively, the playback data unit selector may select the playback data units to be played back in such a manner that when a DVD-Video disk is mounted on the playback apparatus, programs, program chains, parts of titles, or titles recorded on the DVD-Video disk are selected as the playback data units to be played back, and the player unit may perform the playback operation in such a manner that in a case in which a DVD-Audio disk is mounted on the playback apparatus, the player unit plays back audio data recorded on the mounted DVD-Audio disk, while in a case in which a DVD-Video disk is mounted on the playback apparatus, the player unit extracts audio data from the selected playback data units including audio data and moving picture data and plays back only the extracted audio data.

The playback apparatus for playing back a video content medium may be a DVD-Video player for playing back a DVD-Video disk. In this case, the playback data unit selector may select the playback data units to be played back in such a manner that if a DVD-Video disk is mounted on the playback apparatus, title menu information defining a title menu intended to be displayed to prompt a user to select a title to be played is extracted as the menu information from the DVD-Video disk, the extracted title menu information is analyzed to detect titles selectable on the title menu by the user, and the detected titles are selected as the playback data units to be played back, and the player unit may perform the playback operation in such a manner that in a case in which a DVD-Video disk is mounted on the playback apparatus, the player unit plays back the selected playback data units.

Alternatively, the playback data unit selector may select the playback data units to be played back in such a manner that if a DVD-Video disk is mounted on the playback apparatus, part-of-title menu information defining a part-of-title menu intended to be displayed to prompt a user to select a chapter to be played is extracted as the menu information from the DVD-Video disk, the extracted part-of-title menu information is analyzed to detect chapters selectable on the part-of-title menu by the user, and the detected chapters are selected as the playback data units to be played back, and the player unit may perform the playback operation in such a manner that in a case in which a DVD-Video disk is mounted on the playback apparatus, the player unit plays back the selected playback data units.

Alternatively, the playback data unit selector may select the playback data units to be played back in such a manner that when a DVD-Video disk is mounted on the playback apparatus, programs, program chains, parts of titles, or titles recorded on the DVD-Video disk are selected as the playback data units to be played back, and the player unit may perform the playback operation in such a manner that in a case in which a DVD-Video disk is mounted on the playback apparatus, the player unit plays back the selected playback data units.

According to another aspect of the present invention, there is provided a DVD-Video player for use in a vehicle, comprising means for detecting whether or not the car in which the DVD-Video player is installed is running; a video playback unit for playing back moving picture data and audio data of a video content including a set of playback segments recorded on a DVD-Video disk; a no-display playback unit for sequentially selecting playback segments of the video content recorded on the DVD-Video disk and playing back audio data in the selected playback segments without playing back moving picture data in the selected playback segment; and control means for controlling the playback operation such that the video playback unit is responsible for the playback operation when the vehicle is at rest while the no-display playback unit is responsible for the playback operation when the vehicle is running. By employing such a DVD-Video player, it becomes possible for a driver to enjoy the content of a DVD-video disk while driving the car in a safe manner.

BRIEF DESCRIPTION OF THE DRAWINGS

FIGS. 13A and 13B are diagrams showing examples of tables used by the DVD-Video audio player according to the first embodiment of the present invention;

FIG. 15 is a diagram showing an example of a table used by the DVD-Video audio player according to the second embodiment of the present invention;

DESCRIPTION OF THE PREFERRED EMBODIMENTS

The present invention is described in further detail below with reference to preferred embodiments.

A first embodiment is described first. In this first embodiment, the invention is applied to a DVD-Video audio player for playing back audio data recorded on a DVD-Video disk.

Figure 1:
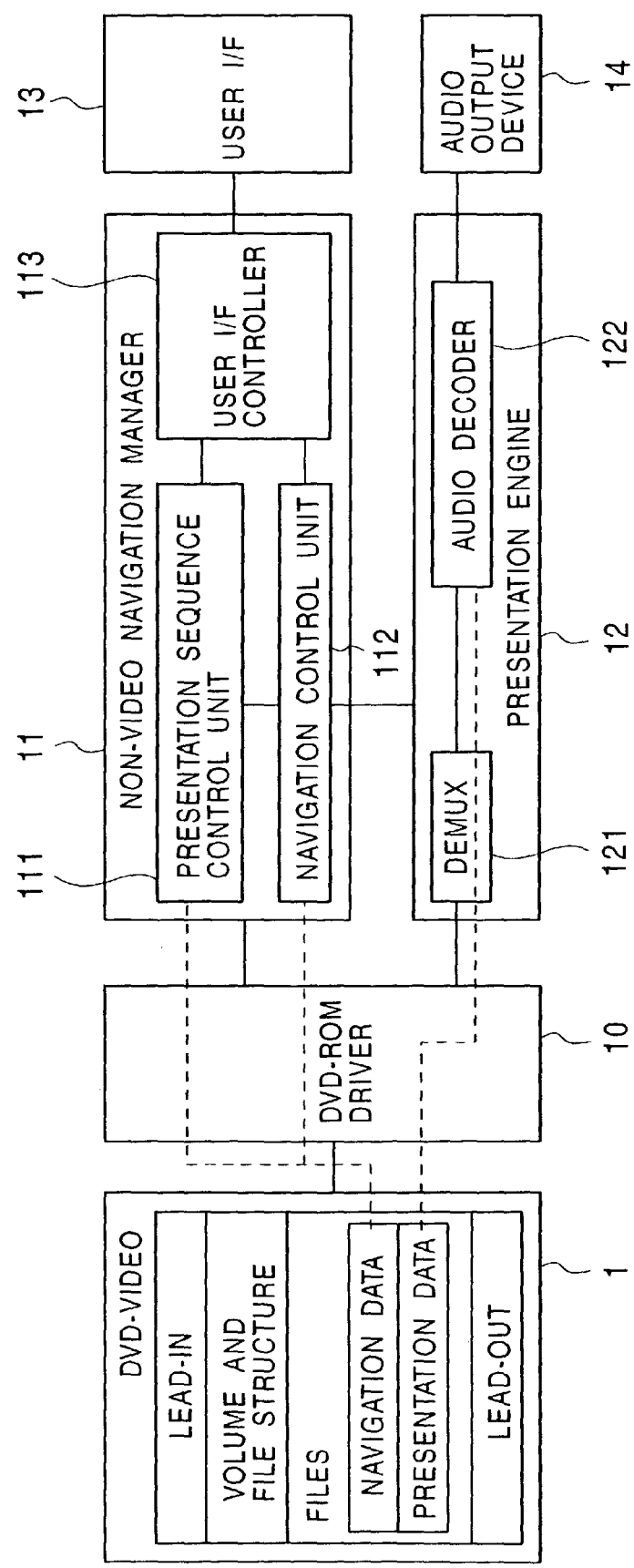
FIG. 1 is a block diagram showing a construction of a DVD-Video audio player according to a first embodiment of the present invention.

FIG. 1 shows a construction of a DVD-Video audio player. As shown in FIG. 1, the DVD-Video audio player includes a DVD-ROM driver 10 for accessing and reading a DVD-Video disk 1, a non-video navigation manager 11, a presentation engine 12 for reproducing audio data, an audio output device 14 such as a speaker, and a user interface 13 such as a remote controller.

The DVD-Video disk 1 includes a lead-in area, a lead-out area, and a data area disposed between the lead-in area and the lead-out area, according to the DVD-ROM standard (physical specifications). The data area includes a volume area and a file structure area, in which volume and file structures are respectively described in accordance with the UDF-Bridge standard (file specifications). A plurality of files are stored in the data area, and application data is described in files in accordance with the DVD-Video standard. The application data can be classified into two types: presentation data which is an entity of presentation such as audio data and moving picture data; and navigation data for controlling execution of presentation.

The presentation engine 12 reads presentation data through the DVD-ROM driver 10 and extracts audio data from the presentation data by using a demultiplexer 121. The extracted audio data is then decoded by an audio decoder 122 and the resultant decoded data is supplied to the audio output device 14. Thus, the presentation engine 12 reproduces the presentation data.

The non-video navigation manager 11 includes a navigation control unit 112, a user interface controller 113, and a presentation sequence control unit 111. The presentation sequence control unit 111 determines a presentation sequence in accordance with the navigation data read through the DVD-ROM driver 10 and a command issued by a user operating a user interface 13 and transferred to the presentation sequence control unit 111 through the user interface controller 113. The navigation control unit 112 controls the presentation engine 12 to reproduce presentation data in accordance with the determined sequence.

An example of a manner in which presentation data and a menu to be played back by a usual DVD-Video player are defined according to the DVD-Video standard is described below.

Figure 2:
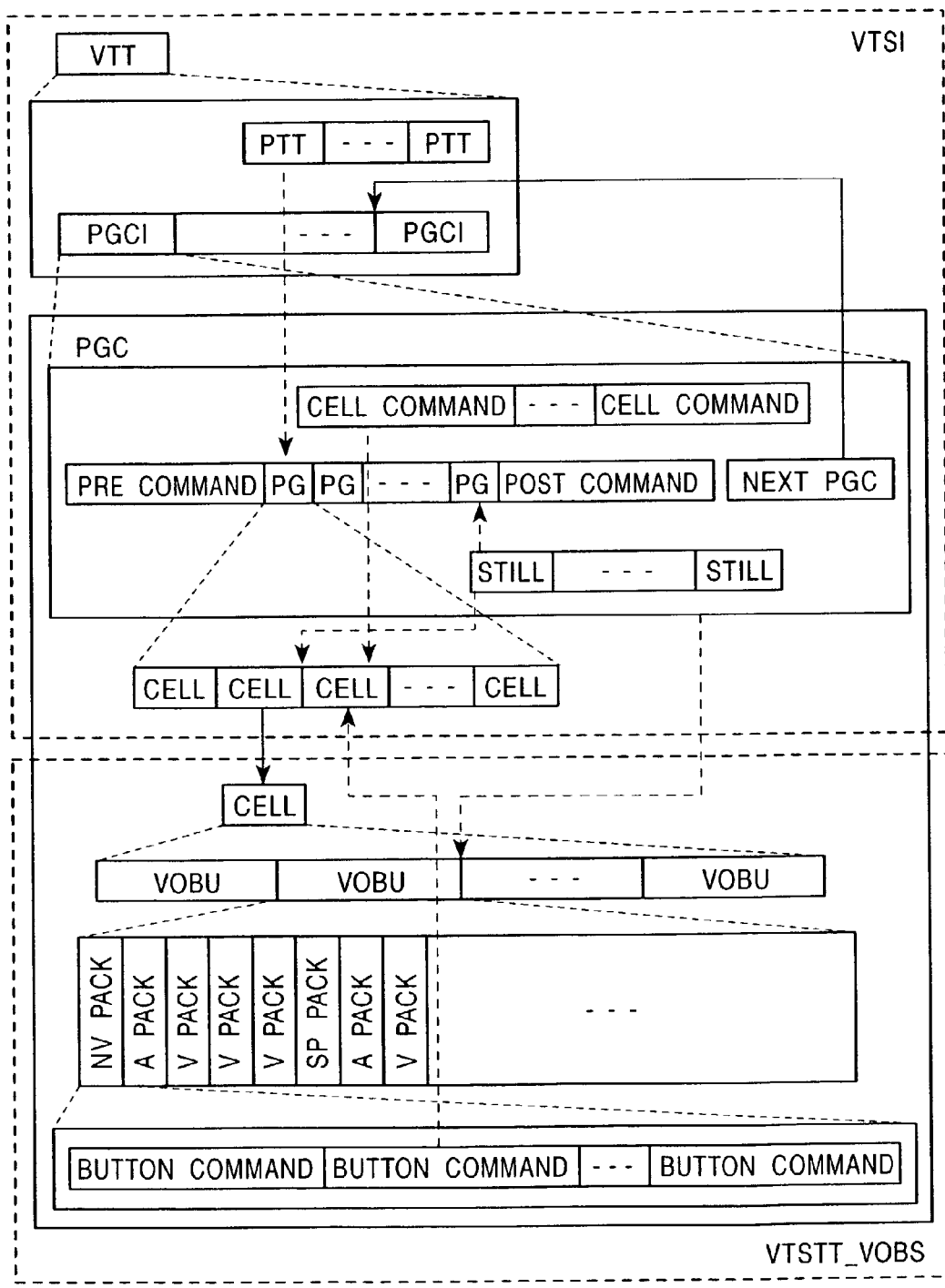
FIG. 2 is a diagram showing a scheme for playing a title according to the DVD-Video standard.

As described earlier, each DVD-Video disk includes a plurality of video titles VTT. FIG. 2 shows a scheme for playing back each VTT. As shown in FIG. 2, each VTT includes one or more program chains (PGCs). The structure of each PGC is defined by program chain information (PGCI). More specifically, the PGCI indicates programs (PGs) included in a PGC, the order in which the PGs should be played back, a pre-command to be executed before a PG at the beginning of the PGC is executed, and a post command to be executed after completion of a PG at the end of the PGC.

Each PG includes one or more cells and each cell includes a plurality of video object units (VOBUs). Each VOBU may include, in addition to one navigation pack (NV-pack), a plurality of video packs (V-packs), a plurality of audio packs (A-packs), and a plurality of still picture packs (SP-packs). Each video pack (V-pack) includes moving picture data, each audio pack (A-pack) includes audio data, and each still picture pack (SP-pack) includes still picture data.

In each PGCI, cell commands which will be executed after completion of playing back of corresponding cells and a still operation (stop operation) to be executed after completion of each VOBU or cell may be defined. Furthermore, the PGCI may include information NEXT-PGCN specifying a PGC to be executed after completion of another PGC.

On the other hand, in the navigation pack (NV-pack) of each VOBU, button commands may be defined which are executed in response to buttons operated by a user during playback of each cell wherein the buttons are displayed by playing back a video pack (V-pack) and a still picture pack (SP-pack).

In a VTT, a part of title (PTT) may be defined. A PTT indicates an entry point pointing to a particular PG in a PGC.

In pre-commands, post commands, cell commands, and button commands, navigation commands to be executed are defined. Each navigation command may include a command to play back a specified PGC or PTT, a command to play back a specified menu, and a command to change a specified system parameter.

Figure 3:
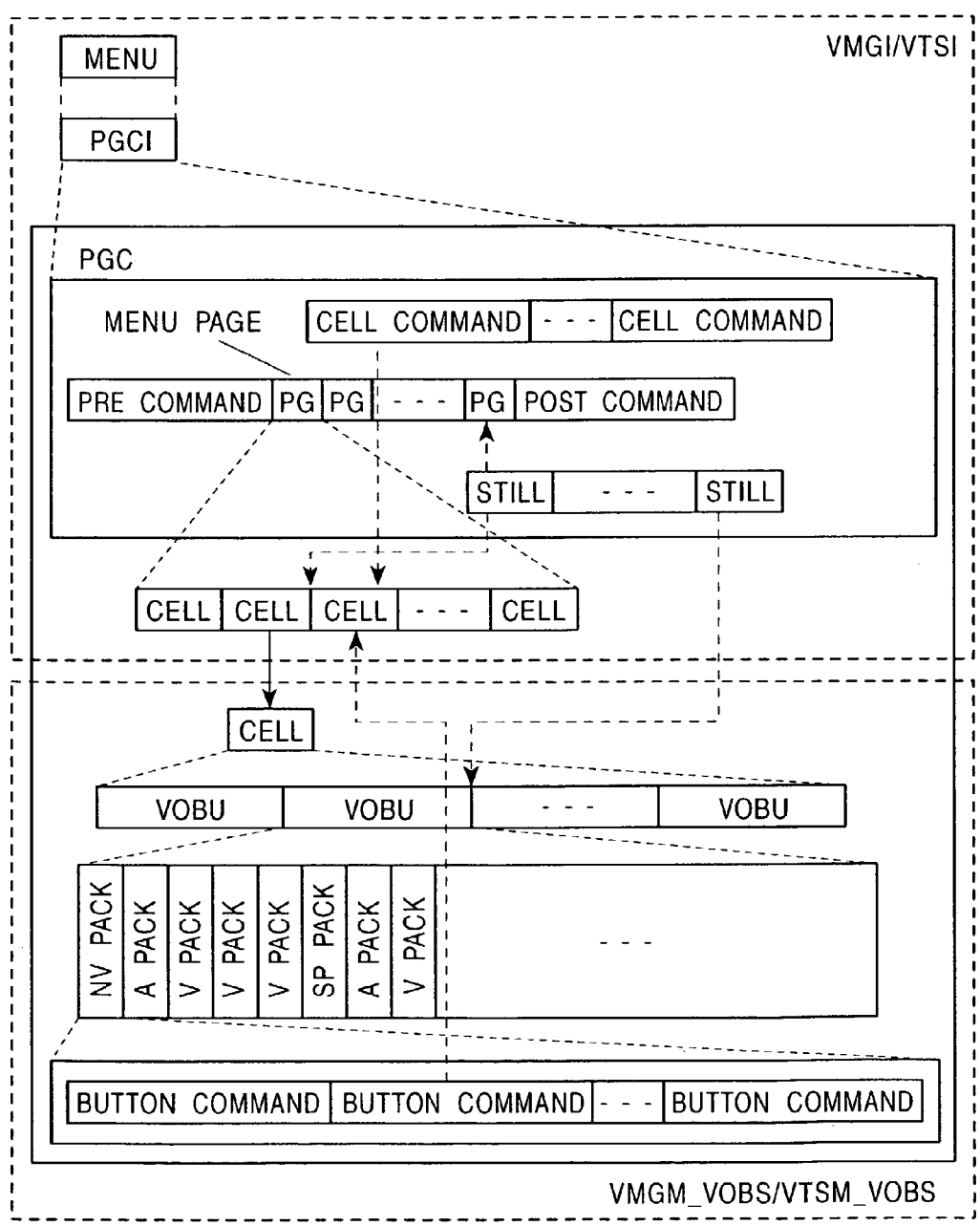
FIG. 3 is a diagram showing a scheme for playing a menu according to the DVD-Video standard.

As shown in FIG. 3, each menu includes one PGC. This PGC is constructed in a similar manner to a PGC of a VTT shown in FIG. 2. However, no VTT is defined in a menu. In PGCI, NEXT-PGCN indicates the sole PGC included in the menu. One program in the PGC corresponds to one page of the menu.

Thus, providers of DVD-Video can freely define the presentation sequence by defining the playback scheme using VTTs and menus in the above-described manner in accordance with the DVD-Video standard.

A specific example of a playback scheme defined for application data according to the DVD-Video standard is described below.

Figure 4:
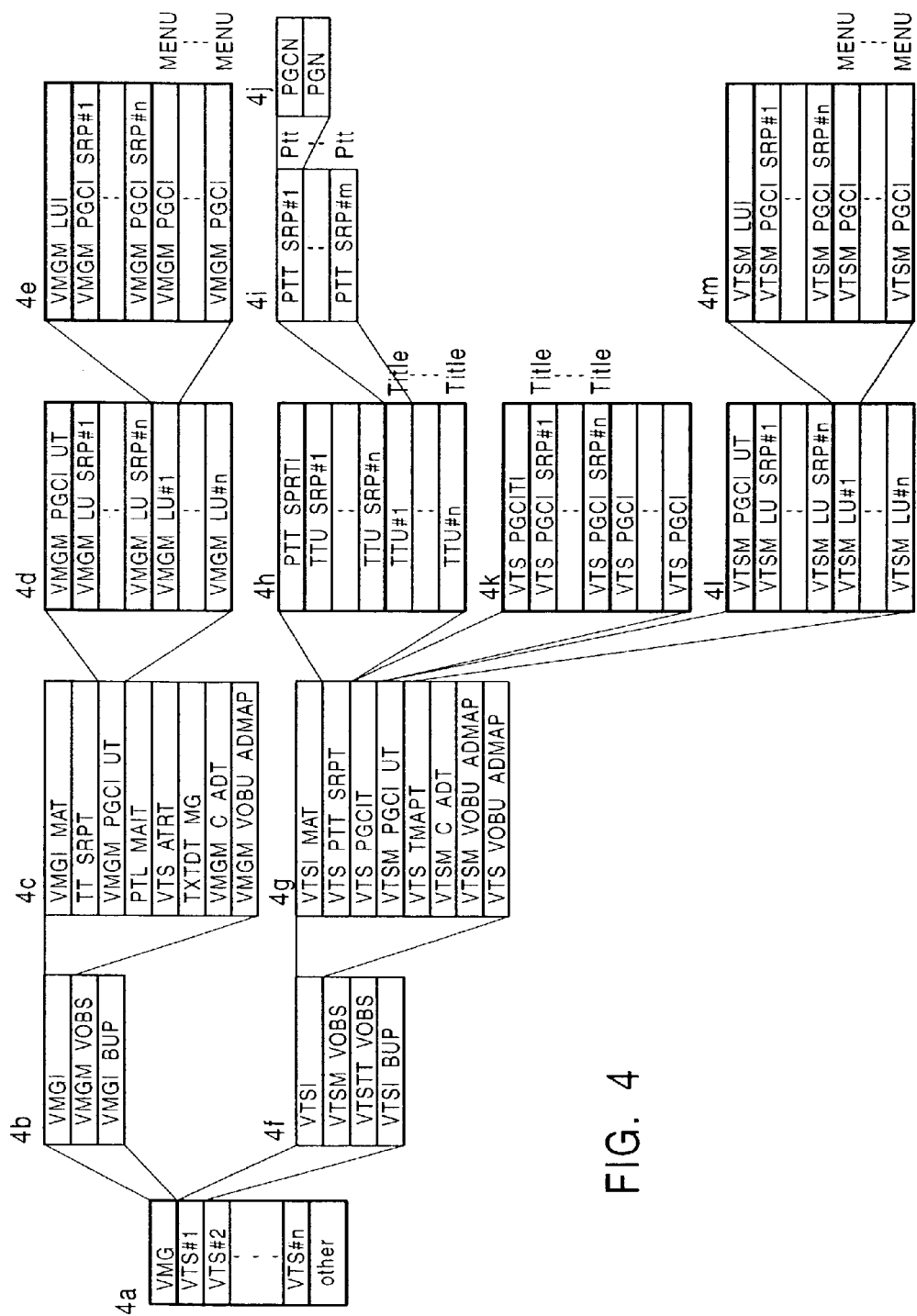
FIG. 4 is a diagram showing a data structure according to the DVD-Video standard.

As shown in FIG. 4, application data according to the DVD-Video standard includes one video manager (VMG) and a plurality of video title sets (VTSs) (4a). The VMG includes video manage information (VMGI) and a video manager menu video object set (VMGM-VOBS) (4b). On the other hand, each VTS includes video title set information (VTSI), a video title set menu video object set (VTSM-VOBS), and a video title set title video object set (VTSTT-VOBS) (4f). Thus, the playback scheme is specified by the VMGI, VMGM VOBS, VTSI, VTSM VOBS, and VTSTT-VOBS, which are enclosed in respective broken-line blocks in FIG. 2 or 3.

Figure 5:
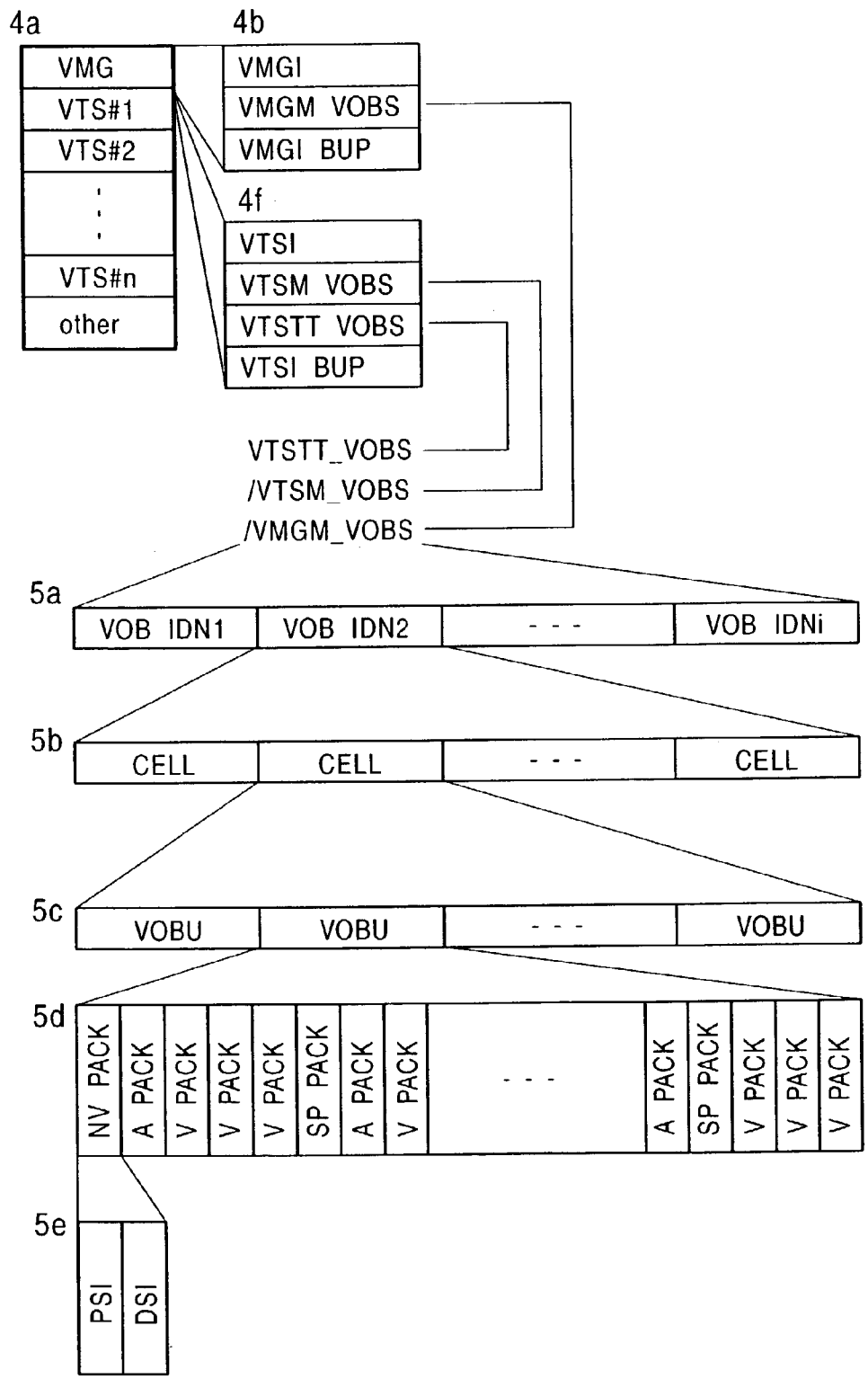
FIG. 5 is a diagram showing a data structure according to the DVD-Video standard.

The VMGM VOBS, VTSM VOBS, and VTSTT-VOBS are similar in structure. That is, as shown in FIG. 5, each of them includes one or more video objects (VOBs) (5a), and each VOB includes one or more cells (5b). As described earlier, each cell includes one or more VOBUs (5c). Each VOBU may include, in addition to one NV-pack, a plurality of V-packs, a plurality of A-packs, and a plurality of SP-packs (5d). The NV-pack includes playback control information (PCI) and data search information (DSI) (5e).

Figure 6:
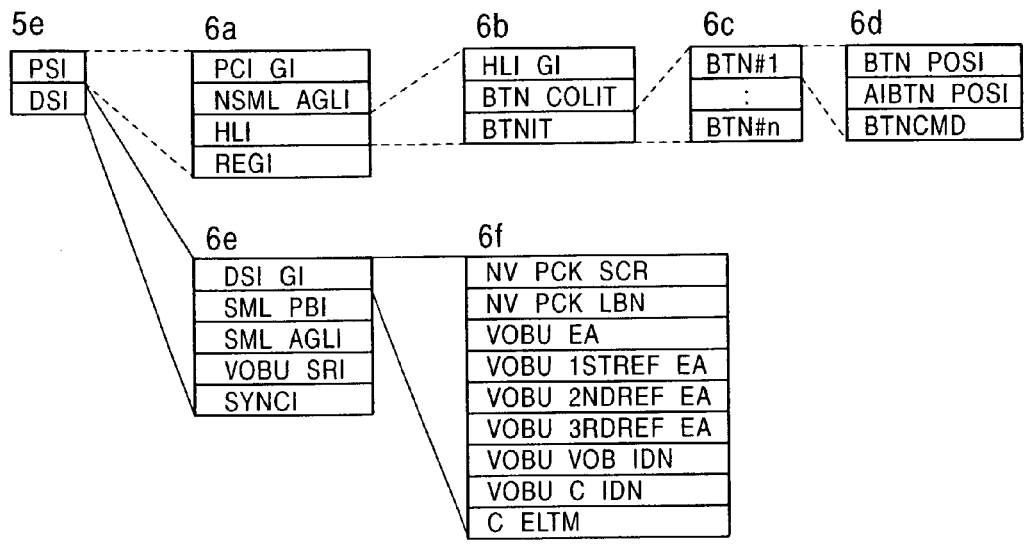
FIG. 6 is a diagram showing a data structure according to the DVD-Video standard.

The PCI includes, as shown in FIG. 6, highlight information (HLI) (6a). The HLI includes a button information table (BTNIT) (6b). The BTNIT includes one or more pieces of button information (BTNI) (6c). In each BTNI, a button command (BTNCMD) and button position information (BTN-POSI) indicating where to display a corresponding button are defined (6d).

On the other hand, the DSI includes DSI general information (DSI-GI) (6e). In the DSI GI, a VOB-ID number of the VOB in which the present VOBU is included (VOBU-VOB-IDN) and a cell ID number of the cell in which that VOBU is included (VOBU-C-IDN) are defined (6f).

The PCI, DSI, VMGI, and VTSI generally correspond to the navigation data described above, and elements of the VOBU except for the NV-pack generally correspond to the presentation data.

Figure 7:
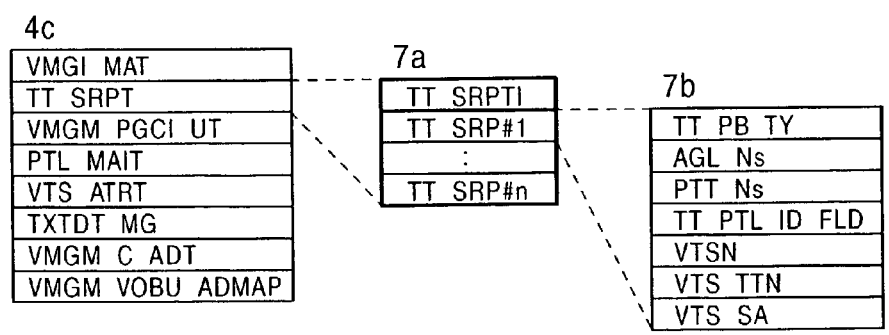
FIG. 7 is a diagram showing a data structure according to the DVD-Video standard.

Referring again to FIG. 4, the VMGI includes a title search pointer table (TT-SRPT) and video manager menu program chain information unit table (VMGM-PGCI-UT) (4c). As shown in FIG. 7, the TT-SRPT includes title search pointers (TT-SRP#) for respective titles (7a). In each TT-SRP#, there are defined a title playback type (TT-PB-TY) indicating whether the corresponding type is a sequential PGC consisting of one PGC including PGs to be played back sequentially, the number of PTTs set in the title (PTT-Ns), the VTS number (VTSN) of the VTS in which the title is included, the title number defined in that VTS (VTS-TTN), and the start address of the VTS in which the title is included (7b).

Figure 8:
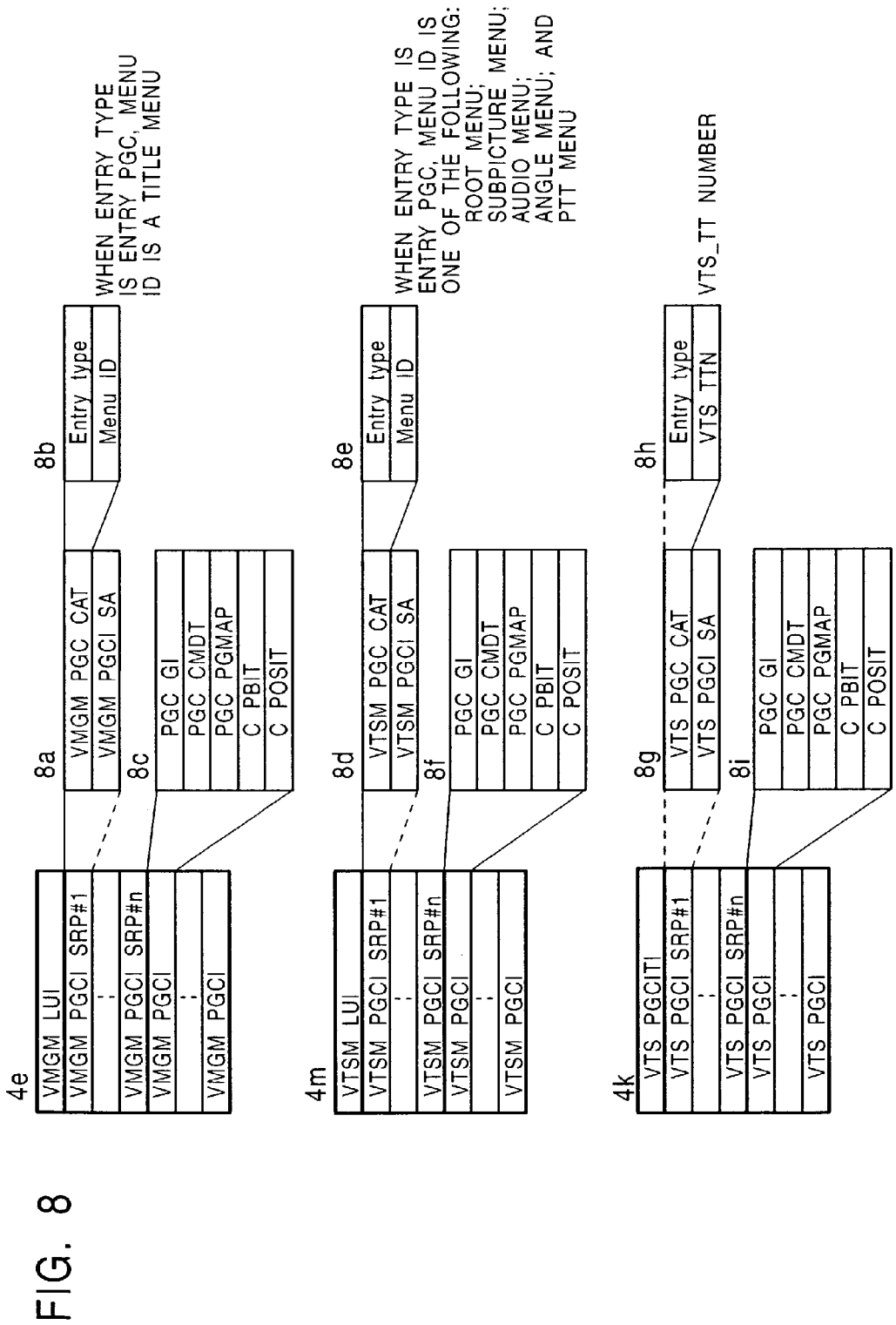
FIG. 8 is a diagram showing a data structure according to the DVD-Video standard.

Referring again to FIG. 4, the VMGI includes a video manage information management table (VMGI-MAT), and a video manager menu program chain information unit table (VMGM-PGCI-UT). In the VMGI-MAT, first play PGCI (FP-PGCI) indicates a PGCI to be played back first after playing back of a DVD-Video disk is started. The VMGM-PGCI-UT includes video manager menu language units (VMGM-LU) for respective languages of the menu (4d). The VMGM-LU includes a video manager menu program chain information search pointer (VMGM-PGCI-SRP#) and video manager menu program chain information (VMGM-PGCI) (4e). This VMGM-PGCI is a PGCI which defines the PGC of the menu shown in FIG. 3. In general, the VMGM-PGCI defines the menu PGC which is used in common for respective titles of a DVD-Video disk. The VMGM-PGCI-SRP# is a pointer pointing to the VMGM-PGCI. A VMGM-PGC number (VMGM-PGCN), which is used in the navigation command or the like to indicate the VMGM-PGCI-SRP#, is assigned to the VMGM-PGCI-SRP#. As shown in FIG. 8, the VMGM-PGCI-SRP# includes a video manager menu program chain category (VMGM-PGC-CAT) and a pointer indicating the start address of the VMGM-PGCI (VMGM-PGCI-SA) (8a). The VMGM-PGC-CAT includes a menu ID and an entry type indicating whether the VMGM-PGCI defines an entry PGC (a PGC to be played back first) in the video manager language unit (VMGM-PGCI-LU) (8b). When the entry type indicates that the PGC is an entry PGC, the menu ID indicates a title menu.

Referring again to FIG. 4, the VTSI includes a title search pointer table VTS-PTT-SRPT, a video title set program chain information table VTS-PGCIT, and a video set menu program chain information unit table (VTSM-PGCI-UT) (FIG. 4G).

The VTS-PTT-SRPT includes title units (TTU#) for respective titles in the VTS (4h). Each TTU includes, as shown in FIG. 2, part-of-title search pointers (PTT-SRP#) for respective PTTs set in the title (4i). In each PTT-SRP#, a PGC number (PGCN) indicating an entry point of the PTT and a PG number (PGN) are defined (4j).

The VTS-PGCIT includes video title set PGCI search pointers (VTS-PGCI-SRP#) for respective titles in the VTS and one or more pieces of video title set program chain information (VTS-PGCI). This VTS-PGCI serves as a PGCI defining the PGC of the title shown in FIG. 2.

The VTS-PGCI-SRP# is a pointer pointing to the VTS-PGCI. A VTS title number (VTS-TTN), which is used in the navigation command or the like to indicate the VTS-PGCI-SRP#, is assigned to the VTS-PGCI-SRP#. The VTS-PGCI-SRP# includes, as shown in FIG. 8, a video set program chain category (VTS-PGS-CAT) and a pointer pointing to the start address of the VTS-PGCI (VTS-PGCI-SA) (8g). The VTS-PGS-CAT includes an entry type indicating whether the VTS-PGCI defines an entry-PGC (a PGC to be played back first) in the title and a video set title number (VTS-TTN) (8h).

Referring again to FIG. 4, the VTSM-PGCI-UT includes video set menu language units for respective languages of the menu (VTSM-PGCI-LU) (4L). The VTSM-PGCI-LU includes video set menu program chain information search pointers VTSM-PGCI-SRP# and video set menu program chain information (VTSM-PGCI) (4M). This VTSM-PGCI serves as a PGCI defining the PGC of the menu shown in FIG. 3. In general, the VTSM-PGCI defines the PGC of the menu of titles in the VTS. The VTSM-PGCI-SRP# is a pointer pointing to the VTSM-PGCI. A VTSM-PGC number (VTSM-PGCN), which is used in the navigation command or the like to indicate the VTSM-PGCI-SRP#, is assigned to the VTSM-PGCI-SRP#. The VTSM-PGCI-SRP# includes, as shown in FIG. 8, a video set menu program chain category (VTSM-PGC-CAT) and a pointer pointing to the start address of the VTSM-PGCI (VTSM-PGCI-SA) (8d).

The VTSM-PGC-CAT includes a menu ID and an entry type indicating whether the VTSM-PGCI defines an entry PGC (a PGC to be played back first) in the video set language unit (VTSM-PGCI-LU) (8e). When the entry type indicates that the PGC is an entry PGC, the menu ID indicates one of a root menu, a subpicture menu, an audio menu, an angle menu, and a PTT menu.

As shown in FIGS. 8C, 8F, and 8I, the VMGM-PGCI and VTSM-PGCI defining the PGC of the menu and the VTS-PGCI defining reproduction of the PGC are similar in structure. Hereinafter, those are generically referred to as PGCI.

Figure 9:
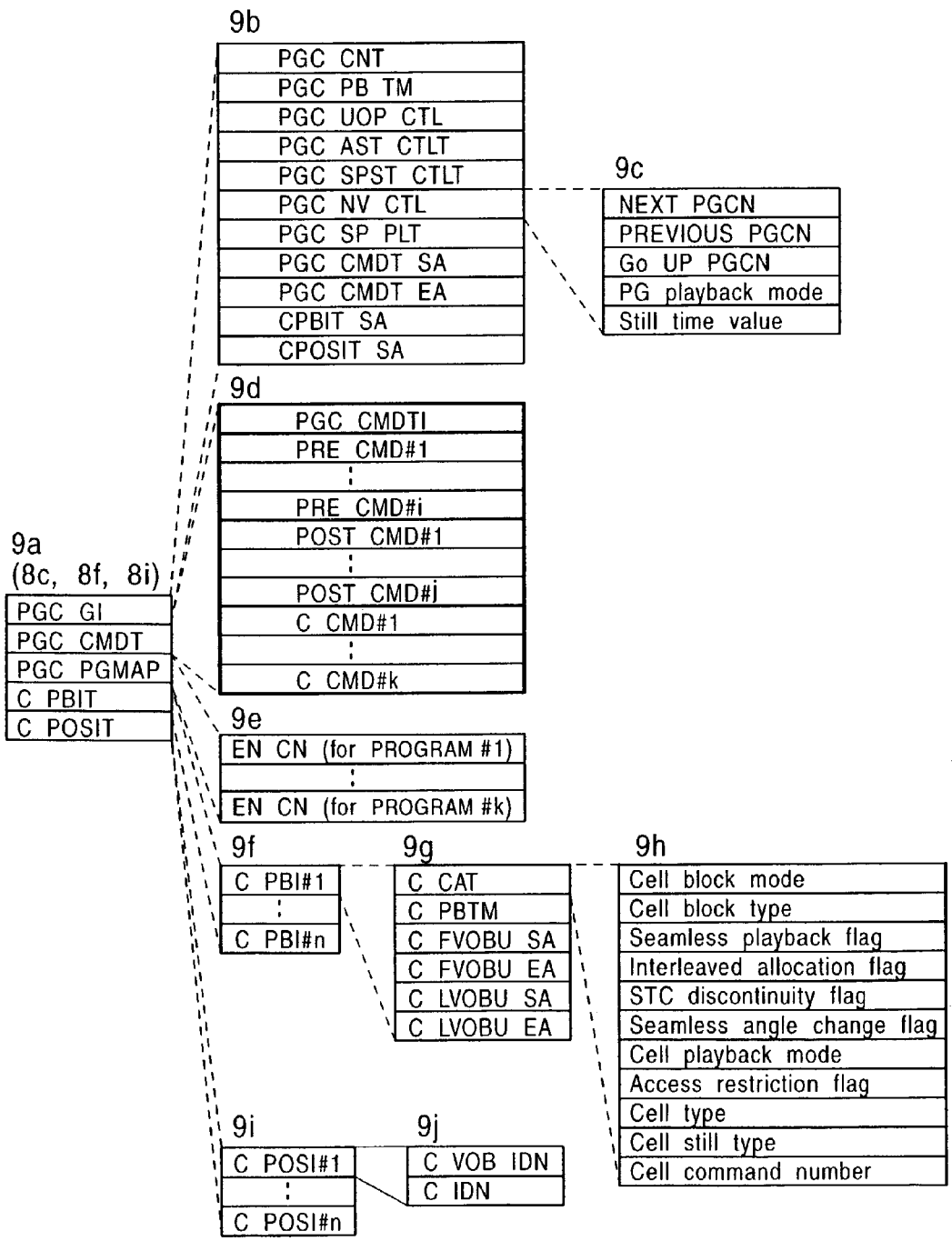
FIG. 9 is a diagram showing a data structure according to the DVD-Video standard.

As shown in FIG. 9, the PGCI includes program chain general information (PGC-GI), a PGC command table (PGC-CMDT), a program chain program map (PGC-PG-MAP), a cell playback information table (C-PBIT), and a cell position information table (C-POSIT) (9a).

The PGC-GI includes a PGC playback time (PGC-PB-TM) and a program chain navigation control (PGC-NV-CTL) (9b). In the PGC-PB-TM, the total playback time of programs included in the PGC is described in hours, minutes, and seconds or in the number of video frames. In the PGC-NV-CTL, there are NEXT-PGCN pointing to a PGC to be next executed after the present PGC shown in FIG. 2, a PG playback mode defining the order in which to play back programs included in the PGC, and a still time value indicating the still time at the end of the playback of all programs included in the program chain shown in FIGS. 2 and 3 (9c).

In the PGC and the command table (PGC-CMDT), as shown in FIGS. 2 and 3, pre-commands (PRE-CMD#) to be executed before starting the programs included in the PGC, post commands (POST CMD#) to be executed after completion of the programs in the PGC, and cell commands (CELL-CMD#) to be executed after completion of playback of respective cells in the programs of the PGC are described (9d).

In the PGC-PGMAP, the cell umber CN of a cell at the beginning of each program of the PGC is described as EN-CN (9d). The cell numbers CN are defined in a cell playback information table (C-PBIT) described below (9e).

In the cell playback information table (C-PBIT), cell playback information (C-PBI#) associated with each cell of each program in the program chain is described, wherein, in general, they are stored in the same order as that in which cells are to be played back (9f). Each C-POSI# is assigned to a cell number CN in accordance with the order in which the cells are stored. Each C-PBI# includes a cell category (C-CAT) (9g). In the C-CAT, a cell playback mode defining the still operation to be executed after the completion of playback of the VOBU, a cell still time defining the still time to be after the completion of playback of the cell shown in FIGS. 2 and 3, and a cell command number, defined in the PGC-CMDT, of the cell command to be executed after completion of the cell shown in FIGS. 2 and 3 are described (9h). Each C-PBI# includes C-PBTM indicating the playback time of the cell, C-FVOBU-SA indicating the address of the first VOBU of the cell, and C-LVOBU-SA indicating the address of the last VOBU of the cell.

In the C-POSIT, cell position information (C-POSI#) associated with a corresponding cell of each program in the program chain is described in the same order as that of the C-PBIT (9i), wherein the VOB number of the VOB in which the cell is included (C-VOB-IDN) and the cell ID number of the cell (C-IDN) are described (9j).

In the data structure described above, the correspondence between the cells and the VOBUs is basically defined by the C-FVOBU-SA and C-LVOBU-SA of the C-PBI#, the C-VOB-IDN and C-IDN of the C-POSI#, and the VOBU-C-IDN and VOBU-VOB-IDN in the DSI-GI (6E) of the DSI shown in FIG. 6.

The example of the relationship between the scheme of playing back titles and menus and the data structure of application data according to the DVD-Video standard has been described above. Note that the relationship between the playback scheme and the data structure employed in the embodiment described above is part of playback schemes and data structures defined in the DVD-Video standard, and many other playback schemes such as the playback scheme depending on parental levels, the multi-angle playback scheme, etc., and related data structures are also defined in the DVD-Video standard.

The operation of the DVD-Video audio player for playing back audio data recorded on a DVD-Video disk is described below.

First, a playback control sequence performed by the DVD-Video audio player to play back a DVD-Video disk is described.

Figure 10A:
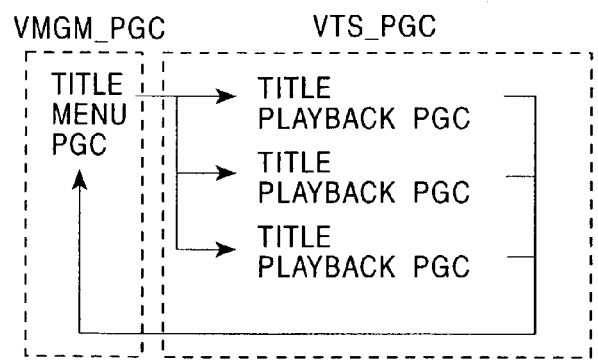
FIGS. 10A to 10C are diagrams showing examples of playback control sequences performed by the DVD-Video audio player in playing back a DVD-Video disk, according to the first embodiment of the present invention.
Figure 10B:
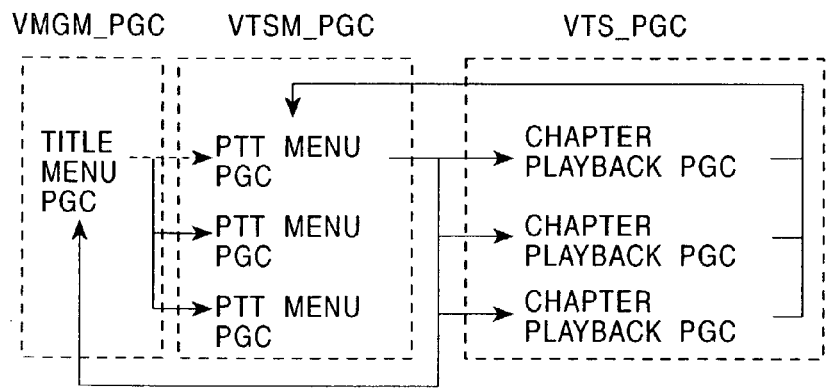
Figure 10C:
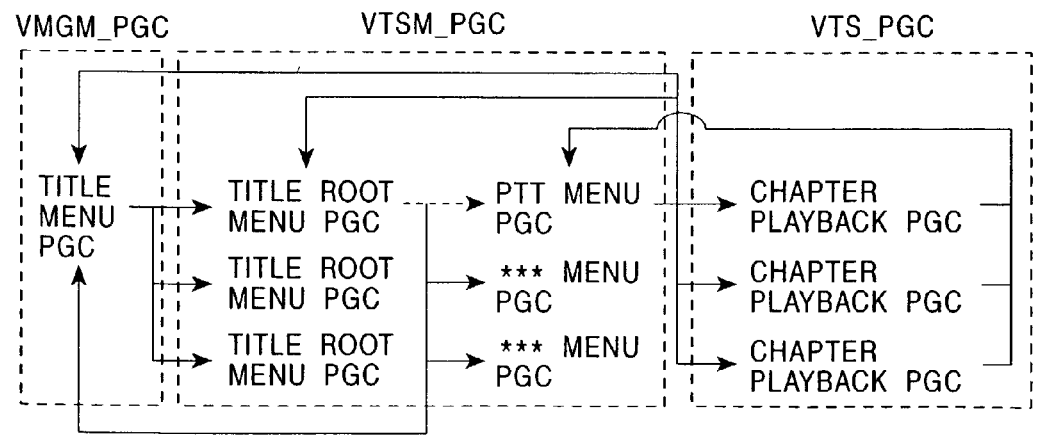

The DVD-Video audio player according to the present embodiment is designed to play back audio data from a DVD-Video disk on which a DVD-Video content to be played back in accordance with a playback control sequence, such as that shown in FIGS. 10A to 10C, defined by a provider of the DVD-Video content, is stored.

In the playback control sequence shown in FIG. 10A, a title menu defined in a VMGM-PGC is displayed, one of the titles displayed in the title menu is selected when a corresponding button is clicked, and execution of the selected VTS-PGC is started in accordance with a button command defined for the selected button. After completion of the playback of the title, the VMGM-PGC of the title menu is again executed in accordance with a post command of the last VTS-PGC of the title, thereby displaying the title menu repeatedly.

In the playback control sequence shown in FIG. 10B, a title menu defined in a VMGM PGC is displayed, one of the titles displayed in the title menu is selected when a corresponding button is clicked, and a VTSM-PGC of a PTT menu for selecting a chapter in the selected title is executed in accordance with a button command defined for the clicked button. If a button corresponding to a chapter to be played back is clicked on the displayed PTT menu, execution of the selected VTS-PGC for playing back the chapter is started in accordance with a button command defined for the selected button. After completion of the playback of the chapter, the VTSM-PGC of the PTT menu is again executed in accordance with a post command of the last VTS-PGC of the chapter, thereby displaying the PTT menu repeatedly. If a button for returning to the title menu is clicked on the PTT menu by a user, the VMG-PGC of the title menu is executed in accordance with the button command defined for that button thereby displaying the title menu. In this case, each PTT serves as an entry point indicating the first PG of the first PGC of each chapter.

In the playback control sequence shown in FIG. 10C, a title menu defined in a VMGM-PGC is displayed, one of titles displayed in the title menu is selected when a corresponding button is clicked, and a VTSM-PGC of a title root menu of the selected title is executed in accordance with a button command defined for the clicked button. If a button for calling a PTT menu is clicked on the title root menu, a VTSM-PGC of the PTT menu for selecting a chapter in the title is executed in accordance with a button command defined for the clicked button. If a button corresponding to a chapter to be played back is clicked on the displayed PTT menu, execution of the selected VTS-PGC for playing back the chapter is started in accordance with a button command defined for the selected button. After completion of the playback of the chapter, the VTSM-PGC of the PTT menu is again executed in accordance with the post command of the last VTS-PGC of the chapter, thereby displaying the PTT menu repeatedly. If a button for calling the title menu is clicked on the title root menu or the PTT menu by a user, the VMGM-PGC of the title menu is executed in accordance with the button command defined for that button, thereby displaying the title menu. In the case in which the button for calling the title menu is clicked on the PTT menu by the user, the VTSM-PGC of the title menu is executed in accordance with the button command defined for that button.

In the DVD-Video audio player according to the present embodiment, it is intended to mainly deal with a content whose titles and chapters are all of one sequential PGC type in which PGs are sequentially played back.

FIG. 11 shows buttons disposed in a title menu, a title root menu, and a PTT menu and also shows button commands assigned to respective buttons.

Figure 11A:
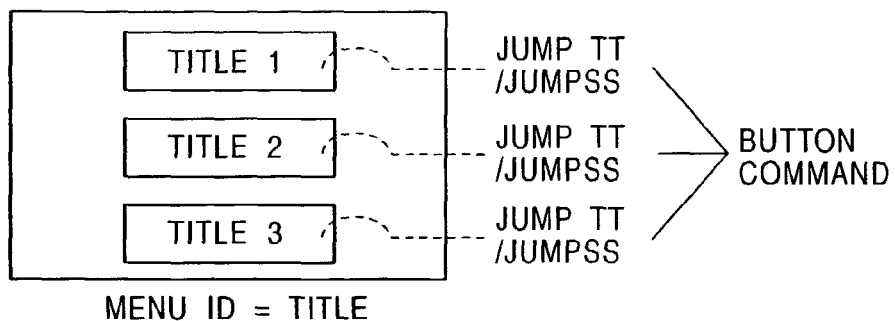
FIGS. 11A to 11C are diagrams showing examples of menu commands defined in menus according to the DVD-Video standard.

As shown in FIG. 11A, the title menu includes buttons for selecting titles. To make it possible to execute PGCs for playing back titles in response to selecting corresponding buttons, navigation commands JUMP-TT for playing back titles are defined for the respective buttons. On the other hand, to make it possible to display a title root menu in response to selecting a button, a navigation command JUMPSS for calling a PGC of the title root menu is defined for the button.

Figure 11B:
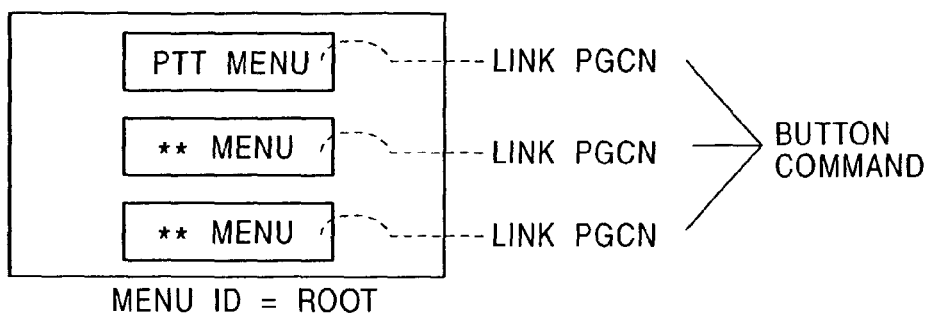

As defined in FIG. 11B, the title root menu includes buttons for various menus, including a PTT menu associated with the title, and navigation commands LINK-PGCN for calling the PGCI of the corresponding menus are defined for the respective buttons.

Figure 11C:
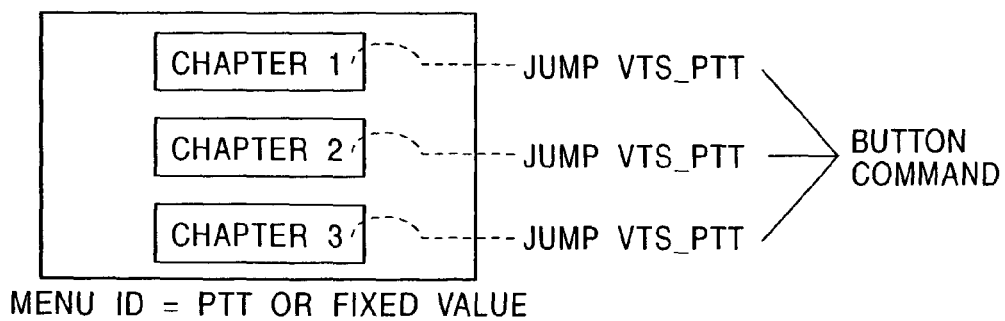

As shown in FIG. 11C, the PTT menu includes buttons for selecting chapters of the title, and navigation commands JUMP-VTS-PTT for playing back PTTs associated with the chapter are defined for the respective buttons.

The operation performed by the DVD-Video audio player according to the present embodiment to play back audio data from a DVD-Video disk is described below.

Figure 12:
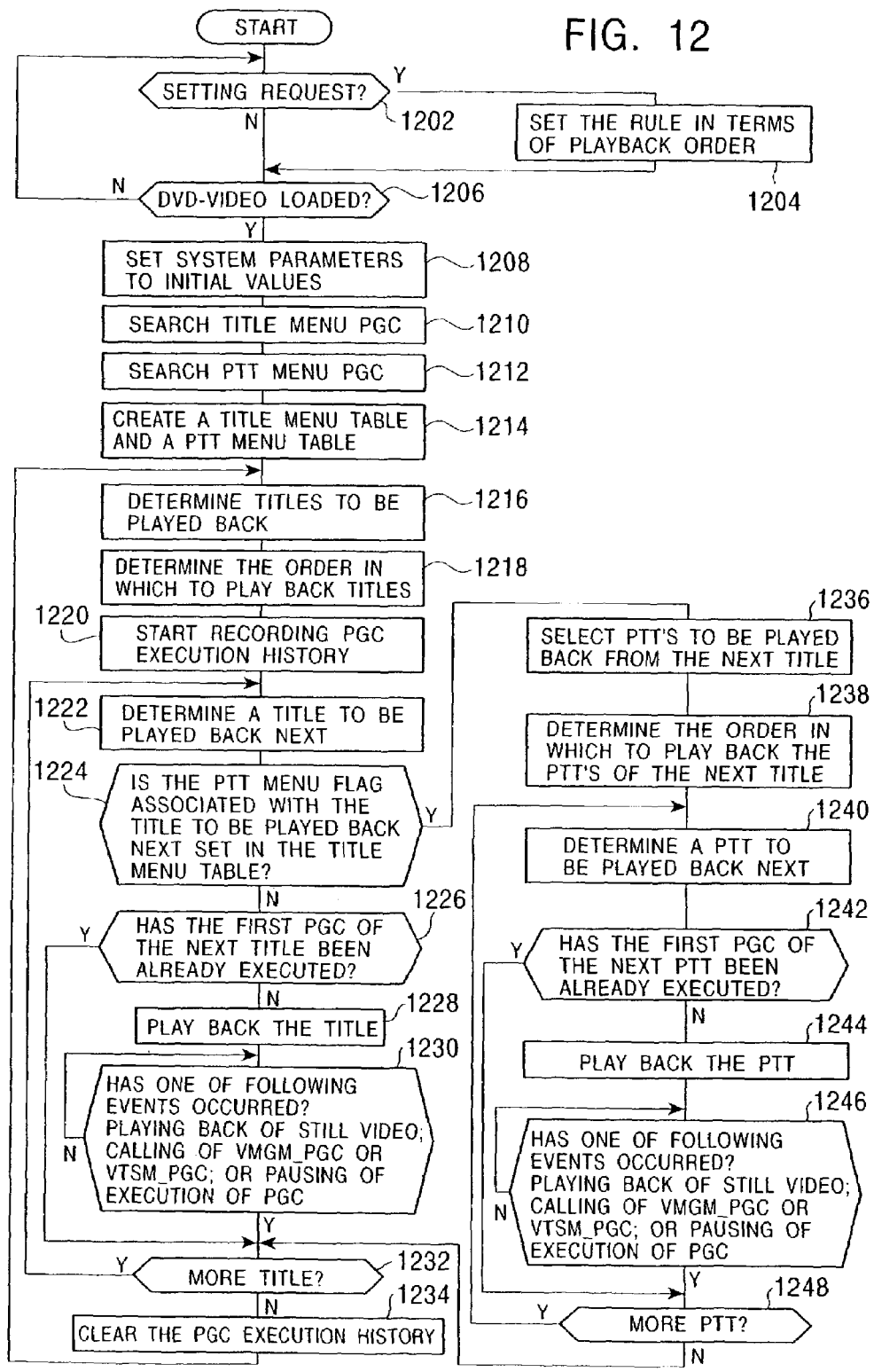
FIG. 12 is a flow chart showing an audio data playback process performed by the DVD-Video audio player according to the first embodiment of the present invention.

FIG. 12 shows an audio playback process performed by the presentation sequence control unit 111 of the DVD-Video audio player. As shown in FIG. 12, before the playback of a DVD-Video disk is started, the presentation sequence control unit 111 receives a playback order rule setting request from a user through the user interface controller 113 and the remote controller (step 1202). If the request is received, the playback order rule is set as specified by the user and a corresponding setting parameter is stored in the presentation sequence control unit 111 (step 1204). Here, the playback order rule may be selected from three modes: a sequential mode, a random mode, and a mode in which the playback order is determined in accordance with the playback time.

Thereafter, if a DVD-Video disk is mounted (step 1206), system parameters associated with a menu language code, a parent level, an angle number, an audio stream number, and the like are set to predetermined initial values (step 1208).

PGCI associated with a title menu is retrieved from VMGMI (step 1210), and PGCI associated with a PTT menu is retrieved from VTSI (step 1212).

In the retrieval of the PGCI associated with the title menu, the PGCI is obtained as VMGM-PGCI (4e) pointed to by VMGM-PGCI-SRP# (4e) which is included in the VMGM-LU# (4e) indicated by the initially-set menu language code and which includes the VMGM-PGCI-CAT (8a) having the MENU-ID (8b) indicating the title menu, or the PGCI associated with the title menu is obtained as the VMGM-PGCI (4e) of the VMGM-PGC which is included in the VMGM-LU# (4d) indicated by the initially-set menu language and which includes the PG including the cell (5b) in the VOBU (5c) having the NV-pack (5d) including the PCI (5e) in which the navigation command JUMP-TT for playing back the title is defined in the BTN-CMD (6d).

The PGCI associated with the PTT menu is given by VTSM-PGCI (4m) pointed to by VTSM-PGCI-SRP# (4m) which is included in the VTSM-LU# (4l) indicated by the initially-set menu language code and which includes the VTSM-PGCI-CAT (8d) having the MENU-ID (8e) indicating the PTT menu, or the PGCI associated with the PTT title menu is given by the VTSM-PGCI (4m) of the VTSM-PGC which is included in the VTSM-LU# (4l) indicated by the initially-set menu language and which includes the PG including the cell (5b) in the VOBU (5c) having the NV-pack (5d) including the PCI (5e) in which the navigation command JUMP-VTS-PTT for playing back the PTT is defined in the BTN-CMD (6d).

Note that, in the above-described retrieval process, retrieval is not performed for PGCI of title menus or PTT menus of VMGM-PGCs or VTSM-PGCs which do not satisfy the initially-set parental level.

If the PGCI associated with the title menu and the PGCI associated with the PTT menu are retrieved, a title menu table and the a PTT menu table are created as shown in FIG. 13 (step 1214).

In the title menu table, as shown in FIG. 13A, all navigation commands for playing back titles, described in BTN-CMDs (6d) of the PCI of NV-pack of VOBUs of the title menu PGC are described such that no duplication occurs. In the case in which a PTT menu of a title specified by a title playback navigation command has been retrieved, the PTT menu flag associated with that navigation command is set. Furthermore, the playback time of the title indicated by the title playback navigation command is defined, for that navigation command, in the PGC-PB-TM (9b) of the PGC-GI of the VTS-PGCI (8i) pointed to by the VTS-PGCI-SRP# (4k) of the title.

On the other hand, in the PTT menu table, as shown in FIG. 13B, all PTT playback navigation commands described in BTN-CMDs (6d) of PCI of NV-packs of VOBUs in the PTT menu PGC are described for each title such that no duplication occurs. Furthermore, the playback time of the PTT indicated by each title playback navigation command is defined, for that navigation command, in the PGC-PB-TM (9b) of the PGC-GI of the VTS-PGCI (8i) pointed to by the PTT-SRP# (4i) of the PTT.

Referring again to FIG. 12, the presentation sequence control unit 111 detects title playback navigation commands from the title menu table and determines them as titles to be played back (step 1216). Thereafter, the order in which to play back the selected titles is determined in accordance with the selected playback order rule (step 1218). In a case in which the playback order rule is set in the sequential mode, the playback order is determined in order of increasing title numbers. In a case in which the playback order rule is set in the random mode, the playback order is randomly determined. On the other hand, in a case in which playback order rule is set in the playback time priority mode, the playback order of titles is determined in order of decreasing playback times in accordance with the playback times described in the title menu table.

Recording of VTS PGC execution history is then started (step 1220).

A title to be played back next is selected in accordance with the determined playback order (step 1222). It is then determined whether a PTT menu flag associated with the selected title is set in the title menu table (step 1224). If the PTT menu flag is not set, the VTS-PGC execution history is examined to determine whether the first VTS-PGC of this title has already been executed (step 1226). If it has not been executed yet, the navigation command associated with the title in the title menu is executed thereby commanding the navigation control unit 112 to play back the title (step 1228). In the case in which the first VTS-PGC of the title has already been executed, the process jumps to step 1232, which will be described later.

In response to receiving the command to playback the title, the navigation control unit 112 starts playing back the PGCs of the title from the first VTS-PGC thereof, as with conventional DVD-Video players. In response, the presentation engine 12 plays back A-packs in VOBUs in respective PGCs.

If the navigation control unit 112 detects the occurrence of one of playing in a still mode, calling a VMGM-PGC, calling a VTSM-PGC, and pausing of execution of PGC (including a state in which it is impossible to determine which PGC should next be executed after the completion of a PGC), the navigation control unit 112 stops playing the VTS-PGC and informs the presentation sequence control unit 111 of the occurrence of the event. Here, in the case in which the title playback type (TT-PB-TY (7*b*)) indicates that the title is of the sequential type, or for any type of title, the playback of the title may be regarded as being completed when the first PGC thereof is completed, and the playback of the VTS-PGC may be stopped. In this case, the presentation sequence control unit 111 may be informed of this fact.

Calling of a VMGM-PGC or calling of a VTSM-PGC can occur in a post command, a pre-command, or a cell command in a VTS-PGC. Pausing of execution of a PGC can occur at the end of a title. In many cases, playing in the still mode occurs in conjunction with calling of a VMGM-PGC or a VTSM-PGC, although calling of a VMGM-PGC or a VTSM-PGC is not necessarily needed. Note that whether or not a VMGM-PGC or a VTSM-PGC is called, playing back of audio data is not influenced. In the case of conventional DVD-Video players, when one of events described above occurs, some user operation is generally needed to determine which VTS-PGC should be played next.

If the presentation sequence control unit 111 is informed of the occurrence of playing in the still mode, calling the VMGM-PGC, calling the VTSM-PGC, or pausing of execution of the PGC (or completion of playback of the title) (step 1230), the presentation sequence control unit 111 determines whether there is a title to be played back next (step 1232). If a title to be played back next is detected, the process returns to step 1222 to select that title and perform the above-described process on the title. If there are no more titles to be played back, the VTS-PGC execution history is cleared (step 1234), and the process returns to step 1216.

In the case in which it is determined in step 1224 that the PTT menu flag associated with the selected title is set in the title menu table, PTTs corresponding to navigation commands described in the PTT menu table associated with the title are selected as PTTs to be played back (step 1236). The order in which to play back the selected PTTs is determined in accordance with the playback order rule (step 1238). In the case in which the playback order rule is set in the sequential mode, the playback order of PTTs is determined in order of increasing PTT numbers. In the case in which the playback order rule is set in the random mode, the playback order of PTTs is randomly determined. On the other hand, in the case in which the playback order rule is set in the playback time priority mode, the playback order of PTTs is determined in order of decreasing playback times in accordance with the playback times described in the PTT menu table.

A PTT to be played back next is then determined in accordance with the playback order (step 1240). The VTS-PGC execution history is then examined to determine whether the first PGC of the selected PTT has already been executed (step 1242). If it has not been executed yet, the navigation command associated with the PTT in the PTT menu is executed thereby commanding the navigation control unit 112 to play back the PTT (step 1244). In the case in which the first PGC of the PTT has already been executed, the process jumps to step 1248, which will be described later.

In response to receiving the command to playback the PTT, the navigation control unit 112 starts playing back PGCs from the first VTS-PGC of the PTT, as with conventional DVD-Video players. In response, the presentation engine 12 plays back A-packs in VOBUs in respective PGCs.

If the navigation control unit 112 detects the occurrence of playing in the still mode, calling the VMGM-PGC, calling the VTSM-PGC, or pausing of execution of the PGC, the navigation control unit 112 stops playing the VTS-PGC, and the navigation control unit 112 informs the presentation sequence control unit 111 of the occurrence of the event. In the above process, the playback of the PTT may be regarded as being completed when the first PGC thereof is completed, and the playback of the VTS-PGC may be stopped. In this case, the presentation sequence control unit 111 may be informed of this fact.

If the presentation sequence control unit 111 is informed of the occurrence of playing in the still mode, calling the VMGM-PGC, calling the VTSM-PGC, pausing of execution of the PGC (or completion of playback of the PTT) (step 1246), the presentation sequence control unit 111 determines whether there is a PTT to be played back next (step 1248). If a PTT to be played back next is detected, the process returns to step 1240 to select that PTT and perform the above-described process on the PTT.

If there is no other PTT to be played back, the process proceeds to step 1232 to determine whether there is a title to be played back next. If a title to be played back next is detected, the process returns to step 1222 to select that title and perform the above-described process on the title. If there is no other title to be played back, the VTS-PGC execution history is cleared and the process returns to step 1216.

The first embodiment of the present invention has been described above. In the first embodiment, navigation commands for playing back titles or chapters are extracted from VMGM-PGCs of a title menu, or from VTSM-PGCs of a PTT menu and extracted navigation commands are described in a title menu table or a PTT menu table. Alternatively, titles or PTTs of titles of a DVD-Video disk may be detected directly from TT-SRP# (7*a*) of a TT-SRPT (4*c*) of VMGI (4*b*) or from PTT-SRP# (4*l*) of a TTU# (4*h*), and navigation commands for playing back detected titles or PTTs may be produced and described in a title menu table or a PTT menu table.

Now, a second embodiment of the present invention is described.

In this second embodiment, unlike the first embodiment in which titles indicated by title playback navigation commands defined in a title menu and chapters indicated by PTT playback navigation commands defined in a PTT menu are selected as those to be played back and are automatically played back in accordance with a properly determined playback order, VTS-PGCs or PGs in VTS-PGCs are selected as units to be selected regardless of how the menu is defined, and the playback order is determined and they are automatically played back in accordance with the determined playback order.

Figure 14:
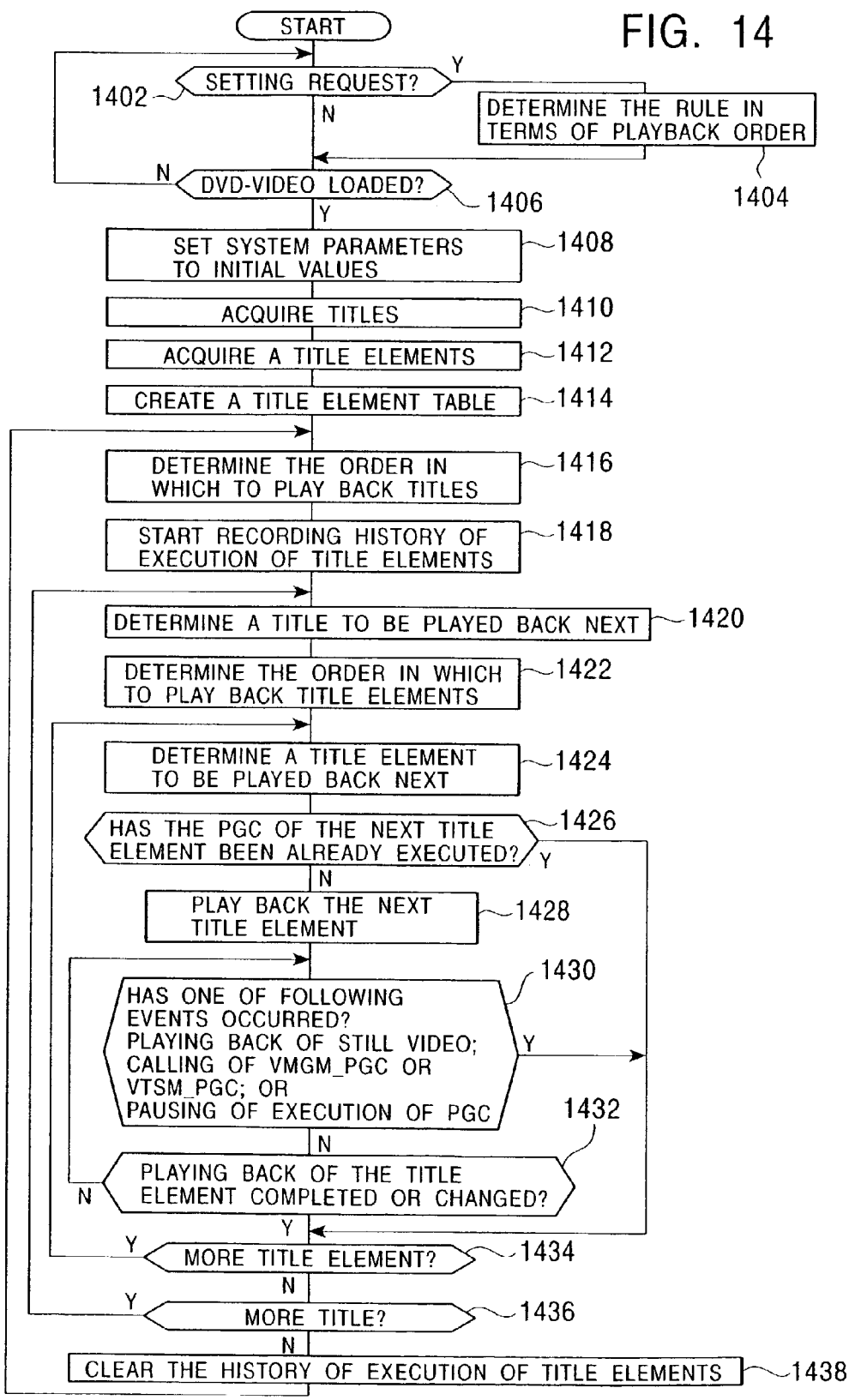
FIG. 14 is a flow chart showing an audio data playback process performed by the DVD-Video audio player according to a second embodiment of the present invention.

FIG. 14 shows an audio playback process performed by the presentation sequence control unit 111 of the DVD-Video audio player according to the second embodiment.

As shown in FIG. 14, as in the first embodiment, if the presentation sequence control unit 111 receives a playback order rule setting request from a user, the presentation sequence control unit 111 sets the playback order rule as specified by the user and internally stores a corresponding setting parameter (steps 1402 and 1404). Thereafter, if a DVD-Video disk is mounted (step 1406), system parameters associated with a menu language code, a parental level, an angle number, an audio stream number, and the like are set to predetermined initial values (step 1408).

A TT-SRPT of VMGI of a VMG is then examined to determine titles included in the DVD-Video disk (step 1410), and information associated with title elements of respective titles are acquired from corresponding VTSs (step 1412). Thereafter, identifiers of the respective elements and playback times of the respective elements are described in an element table as shown in FIG. 15 (step 1414). Here, the title elements refer to units to be played back in accordance with the second embodiment. More specifically, VTS-PGCs or PGs in VTS-PGCs are selected as elements. The playback times of title elements of VTS-PGCs are determined from PGC-PB-TMs (9b) of PGC-GI of VTS-PGCI (8i). In the case of PGs, the playback time of each PG is given by the sum of C-PGTMs (9b) of C-PBI# (9f) of cells of that PG, determined from the PGC-PGMAP of VTS-PGCI (8i).

In the above process of acquiring information associated with title elements, title elements which do not satisfy the requirements in terms of the initially-set parental level are excluded.

In a case in which a title or a PTT is composed of only a single PGC, such a title or PTT can also be employed as an element.

The presentation sequence control unit 111 then determines the order of playing titles in accordance with the playback order rule in a similar manner as in the first embodiment (step 1416). In the case in which the playback order rule is set in the playback time priority mode, the playback order is determined in accordance with the playback times of the respective titles described in PGC-PG-TMs (9b) of PGC-GI of VTS-PGCI (8i) pointed to by VTS-PGCI-SRP# (4k) of the respective titles.

Recording of execution history of title elements is then started (step 1418).

A title to be played back next is then determined in accordance with the title playback order (step 1420), and the order in which to play back title elements of the selected title is determined in accordance with the playback order rule in a similar manner to the determination of the order in which to play back titles (step 1422).

The execution history is then checked to determine whether the selected title element has been played back (step 1426). If the title element has not been played back yet, a command to play back the title element is issued to the navigation control unit 112 (step 1428). In the case in which the title element has already been played back, the process jumps to step 1434, which will be described later.

If the title element specified by the playback command is a VTS-PGC, the navigation control unit 112 starts playing that VTS-PGC. In response, the presentation engine 12 plays back A-packs in VOBUs in the VTS-PGC. On the other hand, in the case in which the specified title elements is a PG, the navigation control unit 112 starts playing VPG thereof. In response, the presentation engine 12 plays back A-packs in VOBUs in that PG.

In the above process, the navigation control unit 112 does not play elements in the still mode.

If the navigation control unit 112 detects the occurrence of one of calling the VMGM-PGC, calling the VTSM-PGC, pausing of execution of the PGC, completion of playback of the specified title element, and a change in playback element from the title element to another title element, the navigation control unit 112 stops playing the title element and informs the presentation sequence control unit 111 of the occurrence of the event.

In response to receiving the notification (steps 1430 and 1432), the presentation sequence control unit 111 determines whether there is a title element to be played next (step 1434). If there is a title element to be played next, the process returns to step 1424 to select that title element and perform the above-described process on the title element. If there are no more title elements to be played back, the presentation sequence control unit 111 determines whether there is a title to be played back next (step 1436). If a title to be played next is detected, the process returns to step 1420 to select that title and perform the process on the title. However, if there are no more titles to be played back, the title element playback history is cleared (step 1438), and the process returns to step 1416.

The second embodiment of the present invention has been described above.

According to the first or second embodiment of the present invention, as described above, it becomes possible to play back audio data of titles recorded on a DVD-Video disk without requiring the capability of playing back video data.

In the process (FIG. 12 or 14) performed by the presentation sequence control unit 111 in accordance with the first or second embodiment, the playback of audio data from a loaded DVD-Video disk 1 may be started in accordance with a usual sequence, but the operation may be switched into a mode in which playing is performed in the manner disclosed in the first or second embodiment, in response to the detection of calling a VMGM-PGC, calling a VTSM-PGC, playing in the still mode, or pausing of execution of a PGC (including a state in which it is impossible to determine which PGC should next be executed after completion of a PGC). This makes it possible to directly start playing a DVD-Video disk 1 in the case in which playing of the DVD-Video disk 1 can be started without having to perform some selection operation on a menu. A PGC which should be executed first after starting a DVD-Video disk 1 can be defined in FP-PGCI in VMGI-MAT of VMGI, as described earlier.

A third embodiment of the present invention is described below.

In this third embodiment, the techniques applied to the DVD-Video audio player according to the first or second embodiment are applied to a DVD-Audio player.

Figure 16:
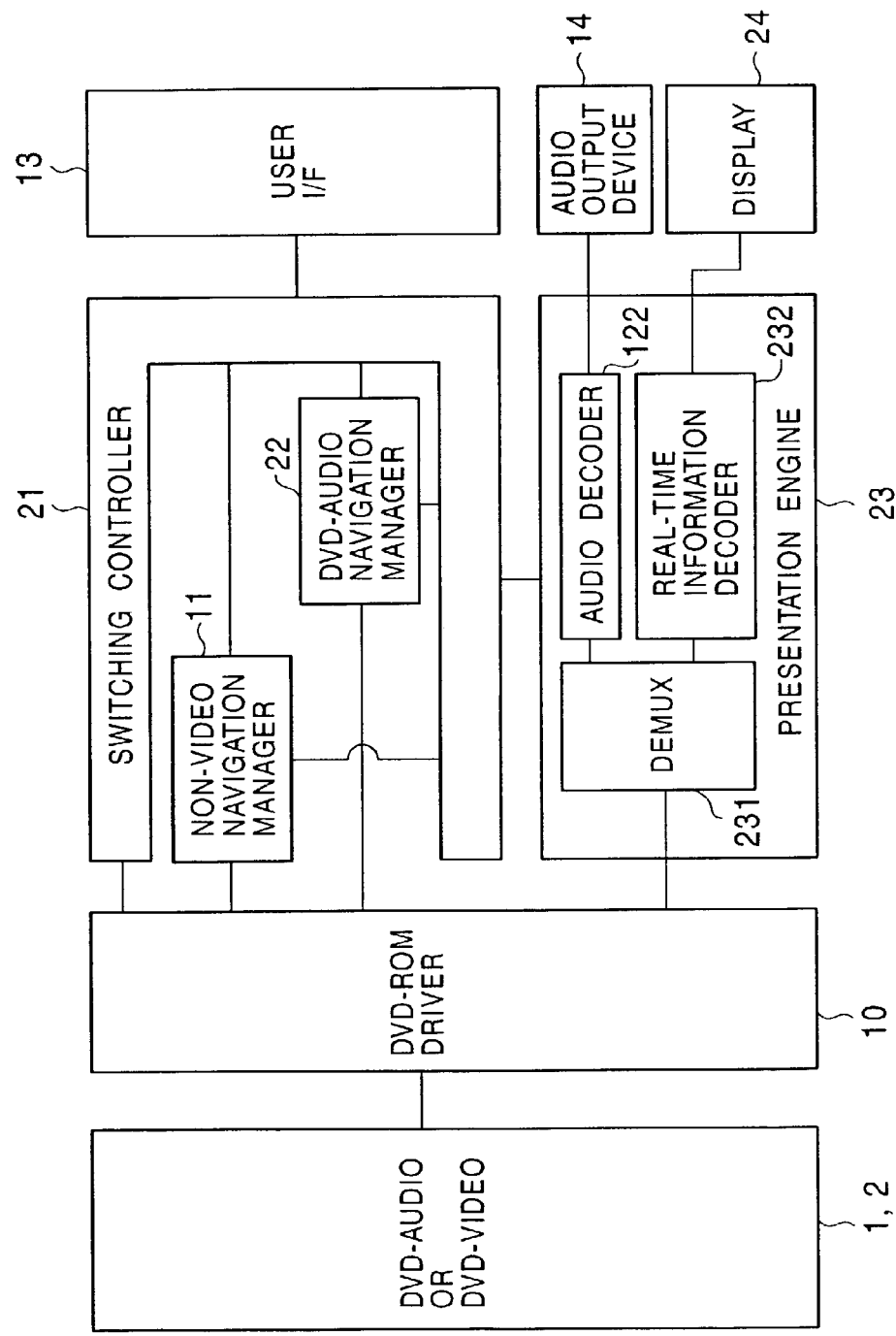
FIG. 16 is a block diagram showing a construction of a DVD-Video audio player according to a third embodiment of the present invention.

FIG. 16 shows a construction of the DVD-Audio player according to the third embodiment of the present invention.

As shown in FIG. 16, the DVD-Audio player includes a DVD-ROM driver 10 for accessing and reading a DVD-Video disk 1 or a DVD-Audio disk 2, a non-video navigation manager 11, a DVD-Audio navigation manager 22, a switching controller 21, a presentation engine 23 for reproducing audio data, an audio output device 14 such as a speaker, a user interface 13 such as a remote controller, and a display 24.

If a DVD-Video disk 1 is mounted on the DVD-ROM driver 10, the presentation engine 23 reads presentation data from the DVD-Video disk 1, under the control of the non-video navigation manager 11. A demultiplexer 231 in the presentation engine 23 extracts audio data from the presentation data and an audio decoder 122 decodes the extracted audio data. The resultant decoded data is provided to the audio output device 14. Thus, the presentation engine 23 reproduces the presentation data. On the other hand, in the case in which a DVD-Audio disk 2 is mounted on the DVD-ROM driver 10, the presentation engine 23 reads presentation data from the DVD-Audio disk 2, under the control of the DVD-Audio video navigation manager 22. The demultiplexer 231 extracts audio data and real-time information from the presentation data, and an audio decoder 122 decodes the extracted audio data and provides the resultant decoded data to the audio output device 14. A real-time information decoder 232 decodes the real-time information and provides the resultant decoded information to a display 24. Thus, the presentation data is played back.

The non-video navigation manager 11 is similar to the non-video navigation manager 11 according to the first or second embodiment. However, the presentation engine 12 used in the first or second embodiment is replaced with the presentation engine 23 for generating audio data. The DVD-Audio navigation manager 22 is responsible for controlling playback of a DVD-Audio disk by using the presentation engine 23 in a similar manner to conventional DVD-Audio players.

The switching controller 21 switches the navigation manager for controlling the playback operation between the non-video navigation manager 11 and the DVD-Audio navigation manager 22 depending on whether a disk to be played is a DVD-Video disk or a DVD-Audio disk.

Figure 17:
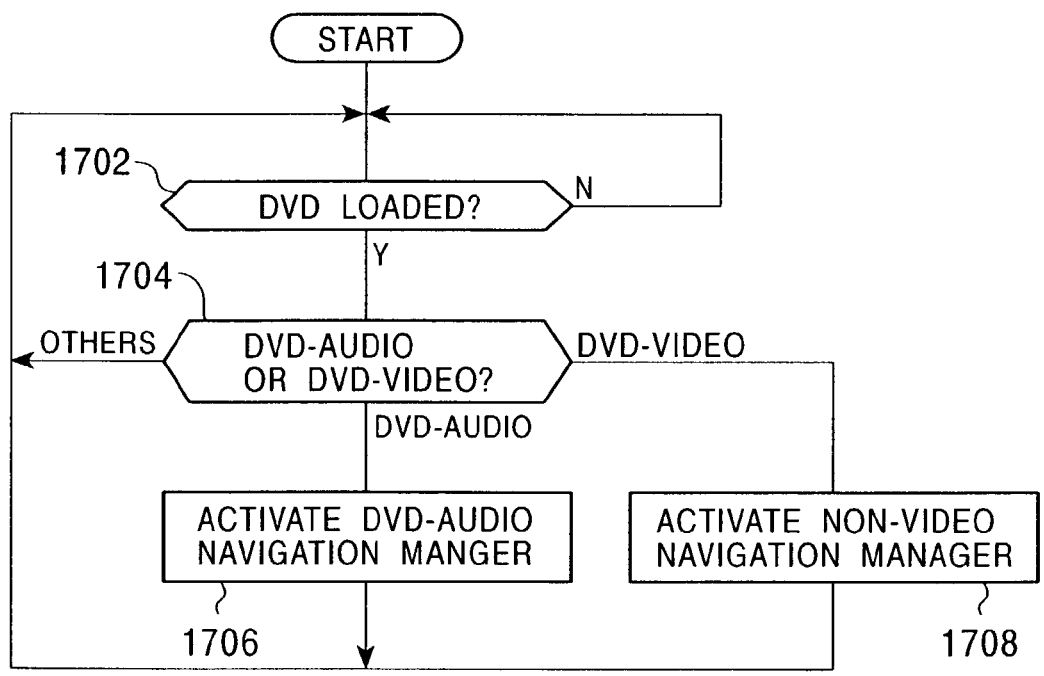
FIG. 17 is a flow chart showing a switching process performed by the DVD-Video audio player according to the third embodiment of the present invention.

That is, as shown in FIG. 17, if a DVD-ROM disk is mounted (step 1702), the switching controller 21 determines whether the mounted DVD-ROM disk is a DVD-Video disk or a DVD-Audio disk. More specifically, if the mounted DVD-ROM includes AMG which plays a similar role in a DVD-Audio disk to that of VMG in a DVD-Video disk, it is determined that the DVD-ROM is a DVD-Audio disk. On the other hand, if the mounted DVD-ROM includes no AMG but includes VMG, it is determined that the DVD-ROM is a DVD-Video disk. If the mounted DVD-ROM disk is a DVD-Video disk, the non-video navigation manager 11 is activated (step 1708), and audio data included in a video content recorded on the DVD-Video disk is played back in a similar manner as in the first or second embodiment described above. However, if the mounted DVD-ROM disk is a DVD-Audio disk, the DVD-Audio navigation manager 22 is activated (step 1706), and audio data and real-time information are played back in a similar manner as with conventional DVD-Audio players.

The third embodiment of the present invention has been described above. According to the third embodiment, it becomes possible to realize a DVD-Audio player capable of playing back not only the contents of DVD-Audio disks but also audio data of contents recorded on DVD-Video disks.

Now, a fourth embodiment of the present invention is described. In this fourth embodiment, the techniques applied to the DVD-Video audio player according to the first or second embodiment are applied to a DVD-Video player.

Figure 18:
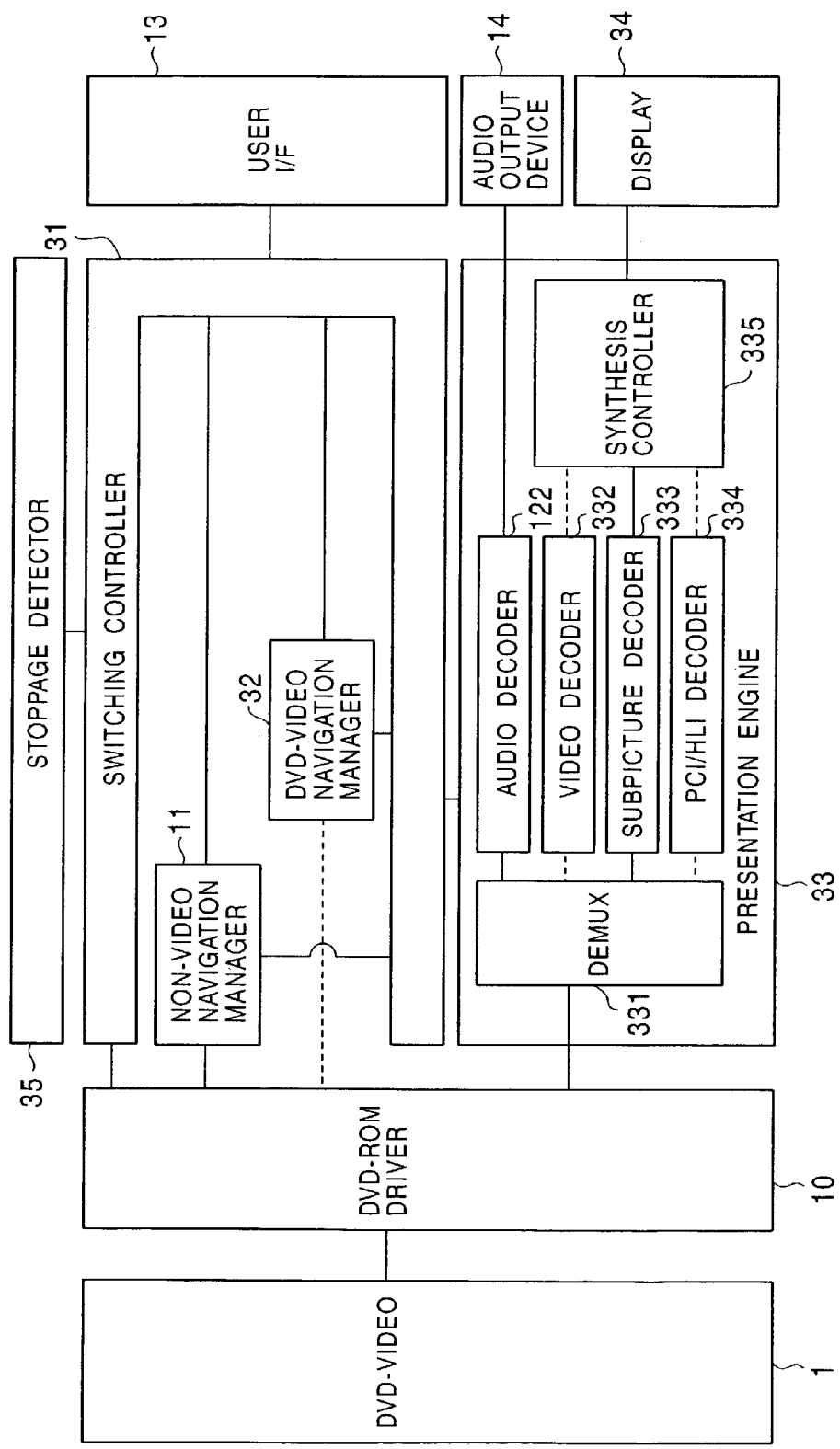
FIG. 18 is a block diagram showing a construction of a DVD-Video player according to a fourth embodiment of the present invention.

FIG. 18 shows a construction of the DVD-Video player according to the fourth embodiment. The DVD-Video player is intended to be used in a car and includes, as shown in FIG. 18, a DVD-ROM driver 10 for accessing and reading a DVD-Video disk 1, a non-video navigation manager 11, a DVD-Video navigation manager 32, a switching controller 31, a presentation engine 33 for reproducing video data, an audio output device 14 such as a speaker, a display 34, a user interface 13 such as a remote controller, and a car stoppage detector 35 for detecting whether a car is running or at rest. The car stoppage detector 35 can determine whether the car is running or at rest on the basis of a car speed pulse indicating the rotation speed of the wheels of the car.

In the presentation engine 33, a demultiplexer 331 reads presentation data from a DVD-Video disk and extracts audio data, moving picture data, subpicture data, button highlight information, and the like from the presentation data. An audio decoder 122 decodes the extracted audio data and provides the resultant data to the audio output device 14. A video decoder 332 decodes the extracted moving picture data, and a subpicture decoder 333 decodes the subpicture data. A PCI/HLI decoder 334 decodes the highlight information and produces a highlight image (such as a button frame). A synthesis controller 335 synthesizes an image from the decoded moving picture, subpicture, and highlight image and provides the resultant image to the display 34.

The non-video navigation manager 11 is similar to the non-video navigation manager 11 according to the first or second embodiment. However, the presentation engine 12 used in the first or second embodiment is replaced with the presentation engine 33 for generating audio data. The DVD-Video navigation manager 32 is responsible for controlling the playback of a DVD-Video disk by using the presentation engine 33 in a similar manner to conventional DVD-Audio players.

The switching controller 31 switches the navigation manager used to control the playback operation between the non-video navigation manager 11 and the DVD-Video navigation manager 32.

Figure 19:
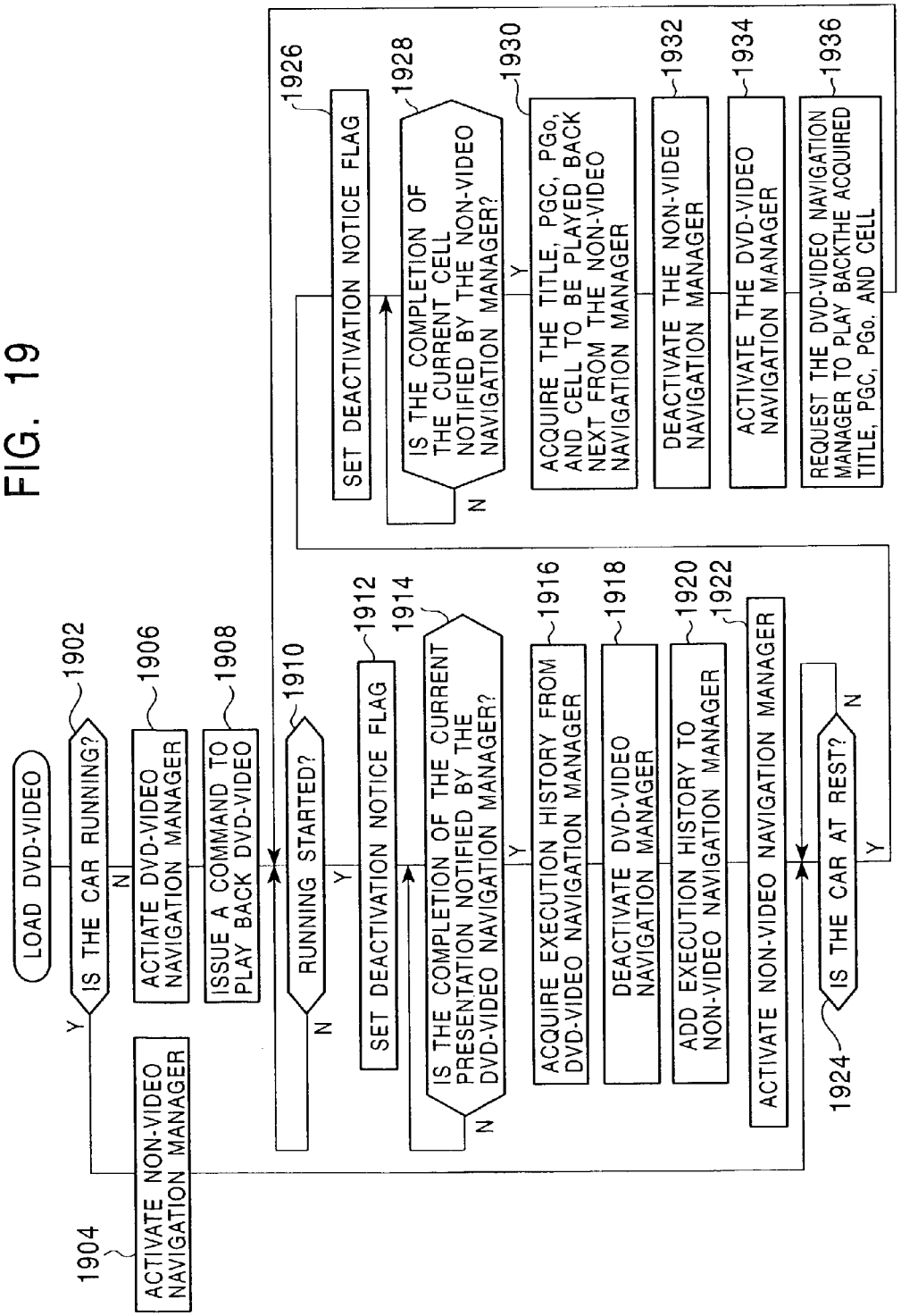
FIG. 19 is a flow chart showing a switching process performed by the DVD-Video player according to the fourth embodiment of the present invention.

That is, as shown in FIG. 19, if a DVD-Video disk is mounted, the switching controller 31 examines the output of the car stoppage detector 35 to determine whether the car is running or at rest (step 1902). If the car is running, the switching controller 31 activates the non-video navigation manager 11 (step 1904). However, if the car is at rest, the switching controller 31 activates the DVD-Video navigation manager 32 (step 1906) and commands the DVD-Video navigation manager 32 to start playing the DVD-Video disk (step 1908). In the case in which the non-video navigation manager 11 is activated, the non-video navigation manager 11 plays back only audio data included in the video content recorded on the DVD-Video disk by using the presentation engine 33 as in the first or second embodiment, without allowing the presentation engine 33 to play the moving picture data included in the video content. In the case in which the DVD-Video navigation manager 32 is activated, the DVD-Video navigation manager 32 plays back the audio data, the moving picture data, the subpicture data and the highlight image recorded on the DVD-Audio disk by using the presentation engine 33 in a similar manner as with conventional DVD-Video players.

When the DVD-Video navigation manager 32 is in the active state, if the car stoppage detector 35 detects that the car has started running (step 1910), a deactivation notice is set in the DVD-Video navigation manager 32 (step 1912) and waits to receive from the DVD-Video navigation manager 32 a notification indicating that the present presentation has been ended (step 1914). If the notification is received, the switching controller 31 acquires the execution history from the DVD-Video navigation manager 32 (step 1916) and deactivates the DVD-Video navigation manager 32 (step 1918). Thereafter, the switching controller 31 sets the execution history acquired from the DVD-Video navigation manager 32 into the non-video navigation manager 11 (step 1920) and activates the non-video navigation manager 11 (step 1922).

When the non-video navigation manager 11 is in the active state, if the car stoppage detector 35 detects that the car has stopped (step 1924), a deactivation notice is set in the non-video navigation manager 11 (step 1926) and waits to receive from the non-video navigation manager 11 a notification indicating that the present cell has been ended (step 1928). If the notification has been received, the switching controller 31 acquires identifiers of a title, a PGC, a PG, and a cell to be played next by the non-video navigation manager 11 (step 1930), and the switching controller 31 deactivates the non-video navigation manager 11 (step 1932) and activates the DVD-Video navigation manager 32 (step 1934). The switching controller 31 then commands the DVD-Video navigation manager 32 to play the title, the PGC, the PG, and the cell indicated by the identifiers acquired from the non-video navigation manager 11 (step 1936).

Figure 20B:
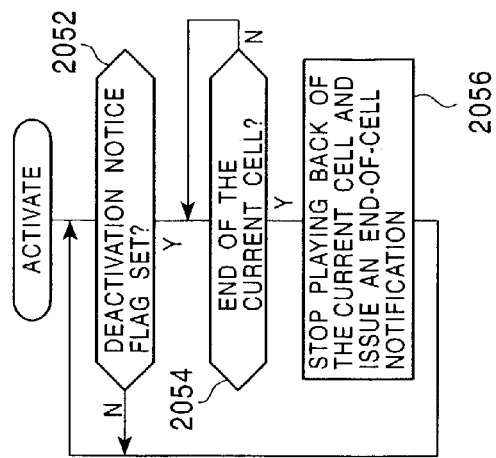
FIG. 20 is a flow chart showing a playback process performed by the DVD-Video player according to the fourth embodiment of the present invention.
Figure 20A:
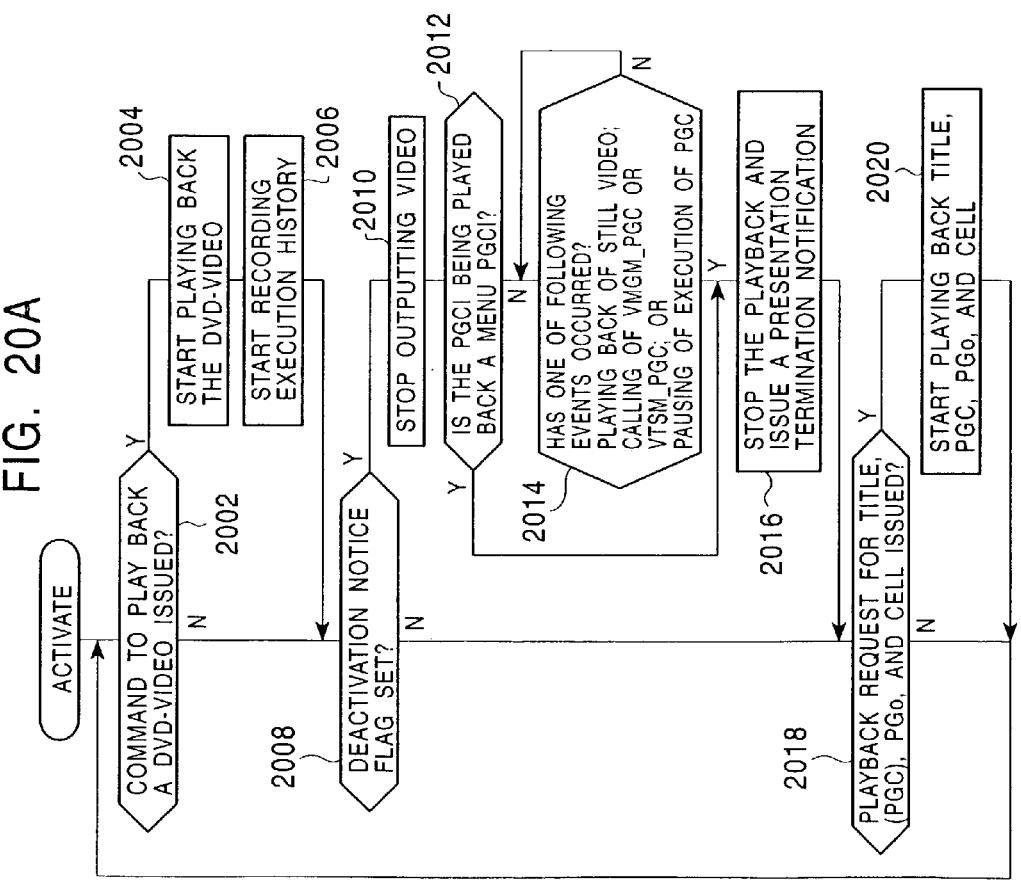

FIG. 20A shows the operation of the DVD-Video navigation manager 32.

As shown in FIG. 20A, if the DVD-Video navigation manager 32 receives a command to play back a DVD-Video disk from the switching controller 31 (step 2002), the DVD-Video navigation manager 32 starts playing back the DVD-Video disk (step 2004). In the case in which the non-video navigation manager 11 is constructed in the manner disclosed in the first embodiment, the DVD-Video navigation manager 32 starts recording the VTS-PGC execution history. On the other hand, if the non-video navigation manager 11 is constructed in the manner disclosed in the second embodiment, the DVD-Video navigation manager 32 starts recording the title element execution history (step 2006).

If the deactivation notice is set by the switching controller 31 (step 2008), the DVD-Video navigation manager 32 commands the synthesis controller 335 to stop providing data to the display (step 2010).

If the PGC being played currently is a VMGM-PGC or a VTSM-PGC (step 2012), the DVD-Video navigation manager 32 stops playing back the PGC and sends a presentation end notification to the switching controller 31 (step 2016). On the other hand, if the PGC being current played is a VTS-PGC, the DVD-Video navigation manager 32 waits for playing in the still mode, calling of a VMGM-PGC, calling of a VTSM-PGC, or pausing of execution of the PGC to occur (step 2014). If occurrence of one of the above events is detected, the DVD-Video navigation manager 32 sends a presentation end notification to the switching controller 31 (step 2016).

On the other hand, if the DVD-Video navigation manager 32 receives a request to play a title, a PGC, a PG, and a cell from the switching controller 31 (step 2018), the DVD-Video navigation manager 32 starts playing from the specified cell of the PG in the PGC of the title (step 2020).

FIG. 20B shows an additional operation performed by the presentation sequence control unit 111 of the non-video navigation manager 11 according to the fourth embodiment.

That is, if the deactivation notice is set (step 2052), the presentation sequence control unit 111 in the non-video navigation manager 11 waits for the cell being currently played back to be completed. After completion of the cell, the presentation sequence control unit 111 determines which cell should be played back next in a similar manner as in the first or second embodiment, and stops the playback operation (step 2054). The presentation sequence control unit 111 then sends a cell completion notification to the switching controller 31 (step 2056). Note that, in the non-video navigation manager 11, when a deactivation notice is set, reproduction of the moving picture by the presentation engine 33 may be continued and the data may be provided to the display from the synthesis controller 335 until the current playback operation is completed.

The non-video navigation manager 11 performs the process in a similar manner as in the first or second embodiment except for the process shown in FIG. 20B. If the execution history is received from the switching controller 31, the presentation sequence control unit 111 of the non-video navigation manager 11 adds the received execution history to the already-existing execution history. In the case in which PGs are employed as title elements according to the technique disclosed in the second embodiment, when PGs are extracted from a PGC, an identifier of the PGCI associated with the PGC from which the PGs are extracted is stored, and the identifier is included in data sent to the switching controller 31 so as to indicate the PGC including a PG to be played back next.

The fourth embodiment of the present invention has been described above. According to the fourth embodiment, it is possible to achieve a DVD-Video player capable of playing video data in a normal mode when the car is at rest, but playing back only audio data when the car is running. This makes it possible for a driver to enjoy the content of a DVD-video disk while driving safely.

In the fourth embodiment described above, switching between the non-video navigation manager 11 and the DVD-Video navigation manager 32 may be performed in response to a predetermined operation performed by a user, instead of being performed in response to the detection performed by the car stoppage detector. This makes it possible for a user to play back audio data of the content recorded on a DVD-Video disk even in a situation in which no display is available.

A fifth embodiment of the present invention is described below.

In this fifth embodiment, the techniques of controlling the playback of audio data, employed in the DVD-Video audio player according to the first or second embodiment, are used to control the playback of video data by a DVD-Video player.

Figure 21:
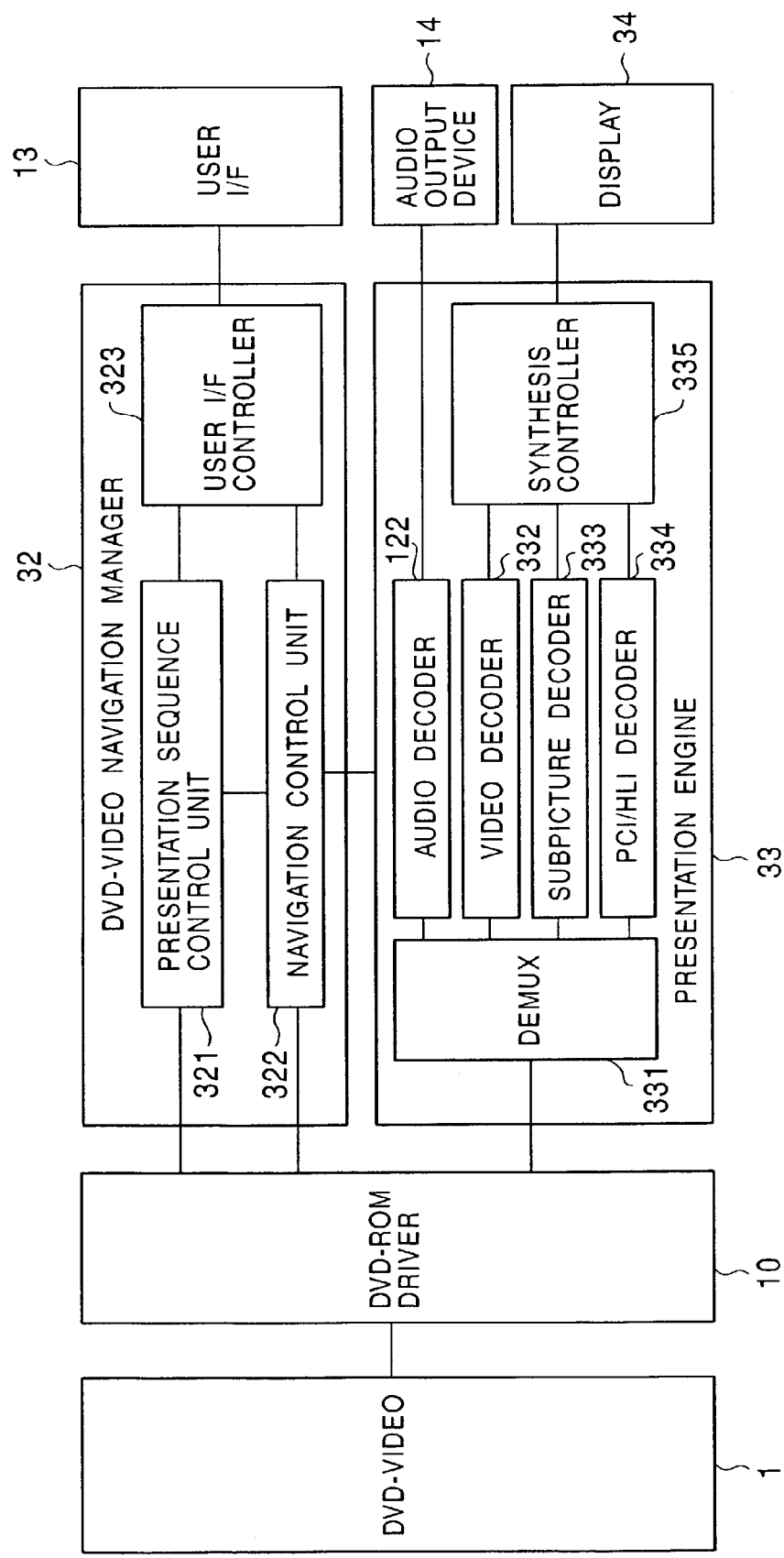
FIG. 21 is a block diagram showing a construction of a DVD-Video player according to a fifth embodiment of the present invention.

FIG. 21 shows a construction of the DVD-Video player according to the fifth embodiment. As shown in FIG. 21, the DVD-Video player includes a DVD-ROM driver 10 for accessing and reading a DVD-Video disk 1, a DVD-Video navigation manager 32, a presentation engine 33 for reproducing video data, an audio output device 14 such as a speaker, a display 34, and a user interface 13 such as a remote controller.

The DVD-Video navigation manager 32 includes a presentation sequence control unit 321, a navigation control unit 332, and a user interface controller 323. The presentation sequence control unit 321 determines a presentation sequence in accordance with navigation data read by the DVD-ROM driver and in accordance with data which is received through the user interface controller 323 from the user interface 13 and which indicates an operation performed by a user. The navigation control unit 322 controls the presentation engine 33 to perform a playback operation in accordance with the determined sequence. The presentation engine 33 is constructed in a similar manner to the presentation engine 33 employed in the fourth embodiment.

The operation performed by the DVD-Video player to play back a DVD-Video disk is described below.

Figure 22:
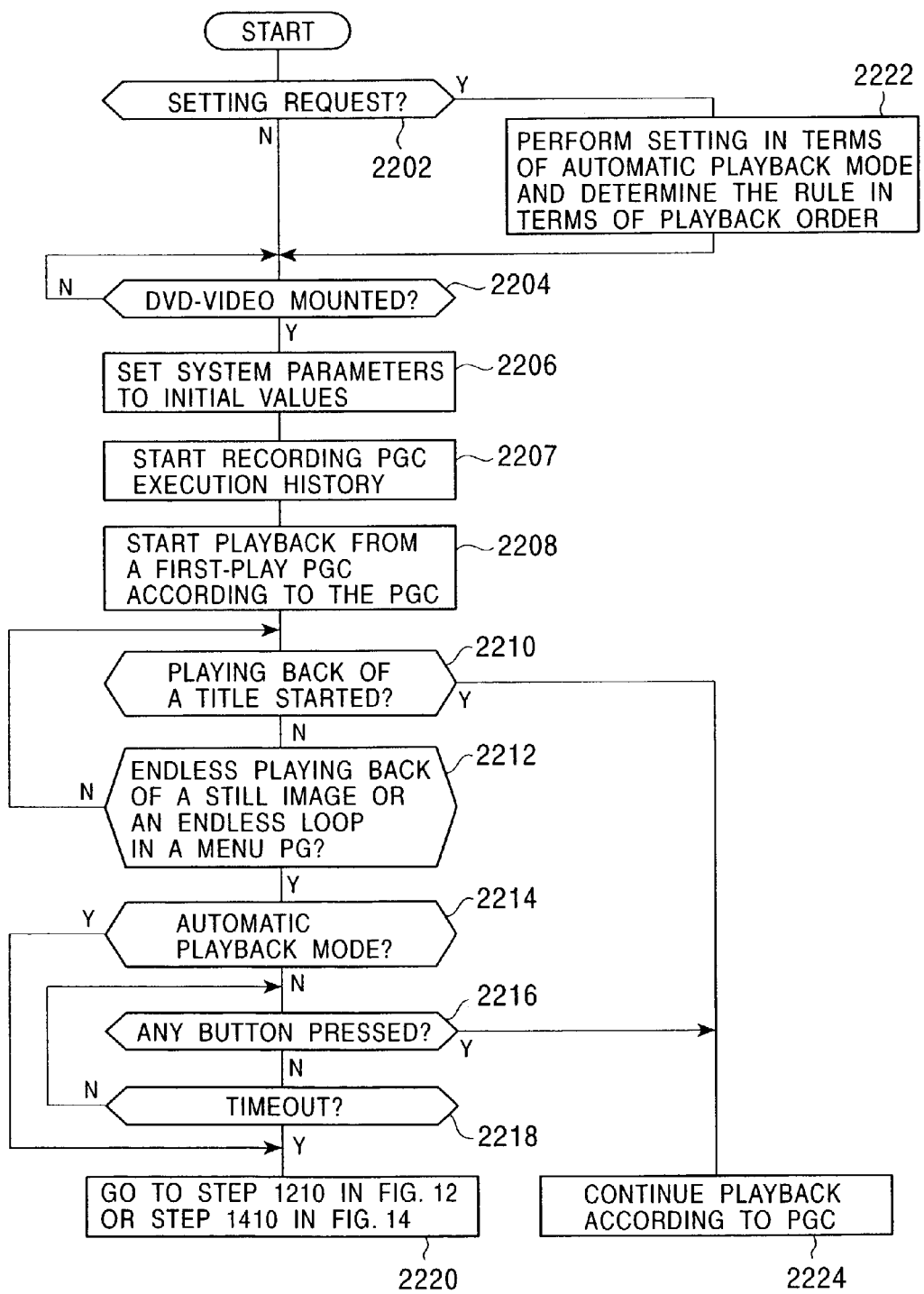
FIG. 22 is a flow chart showing a playback process performed by the DVD-Video player according to the fifth embodiment of the present invention.

FIG. 22 shows the playback process performed by the presentation sequence control unit 321 of the DVD-Video player by controlling the navigation control unit 322.

As shown in FIG. 22, before playing a DVD-Video disk, the presentation sequence control unit 321 receives an initial setting request from a user through the user interface controller 323 and the user interface 13 (step 2202). If the request is received, the automatic/manual mode and the playback order rule are set as specified by the user, and corresponding internal setting parameters are stored (step 2222). The playback order rule may be set into one of the sequential mode, the random mode, and the playback time priority mode, as in the first and second embodiments.

Thereafter, if a DVD-Video disk is mounted (step 2204), system parameters associated with a menu language code, a parental level, an angle number, an audio stream number, and the like are set to predetermined initial values (step 2206). Thereafter, recording of VTS-PGC execution history is started (step 2207), and playing of PGCs is started from a first-play PGC indicated by FP-PGCI in a VMGI-MAT (4*c*) (step 2208). Here in the fifth embodiment, playback refers to an operation performed by the presentation engine 33 to play back not only audio data but full data including moving picture data and audio data.

Starting the playback of a PGC of a title is monitored (step 2210). If the starting of playback of a PGC of a title is detected, the playback is continued in accordance with the PGC in a normal manner (step 2224). Starting the playback of a PGC of a title may be detected, for example, by detecting the occurrence of a title playback command or by detecting the starting of playback of a VTS-PGC in a video title set program chain information table (VTS-PGCIT).

If an endless still mode or an endless loop associated with a PGC of a menu occurs before starting the playback of a title (step 2212), it is determined whether the operation mode is set in the automatic playback mode (step 2214). If the operation mode is set in the automatic playback mode, the process jumps to step 2220.

The endless still mode during the display of a menu can occur when a still time value (9*c*) described in PGCI of a VTSM-PGC or a VTSM-PGC being played indicates that a still image is to be displayed in the endless still mode after completion of playback of the PGC, or when a cell playback mode (9*h*) described in PGCI indicates that a still image is to be displayed in the endless still mode after completion of a cell in a PG in a PGC, or when a cell still type (9*h*) described in PGCI indicates that a still image is to be displayed in the endless still mode after completion of a VOBU in a cell in a PGC. Therefore, an endless still mode which occurs when a menu is displayed can be detected from the above-described values described in PGCI associated with a VMCM-PGC or a VTSM-PGC being played back currently. An endless loop during the display of a menu can occur when Next-PGCI in PGCI associated with a VMCM-PGC or a VTSM-PGC being played currently indicates that a PGC to be played next is the current PGC itself. Therefore, an endless loop during the display of a menu can be detected from Next-PGCI of PGCI associated with a VMCM-PGC or a VTSM-PGC being played currently. Note that Next-PGCI of a PGC of a menu generally indicates the PGC itself.

When an endless still mode or an endless loop of a PGC occurs during the display of a menu (step 2212), if the operation mode is not set in the automatic playback mode (step 2214), the occurrence of an operation performed by a user on a button included in the menu is monitored (step 2216), and the elapsed time since the occurrence of the endless still mode or the endless loop of the PGC is measured (step 2218). If a button operation performed by the user is detected before the elapsed time has reached a predetermined value, playback is continued in a normal manner according to the PGC (step 2224). However, if the elapsed time has reached the predetermined value before detecting a button operation, the process jumps to step 2220.

In step 2220, the process is performed in a similar manner as described earlier with reference to step 1210 and the following steps shown in FIG. 12 except that, in steps 1228 and 1244, not only audio data but full data including moving picture data and audio data is played back by the presentation engine 33. Because the recording of VTS-PGC execution history was started in step 2206, the starting of execution history in step 1220 in FIG. 12 is not performed.

In step 2220, the process may be performed in a similar manner as in step 1410 and the following steps shown in FIG. 14 according to the second embodiment, instead of being performed in step 1210 and the following steps shown in FIG. 12 according to the first embodiment. In this case, in step 1428 shown in FIG. 14, not only audio data but full data including moving picture data and audio data is played back by the presentation engine 33. Because recording of VTS-PGC execution history was started in step 2206, starting of execution history in step 1418 in FIG. 14 is not performed.

The fifth embodiment of the present invention has been described above.

Now, a sixth embodiment of the present invention is described. In this sixth embodiment, it is intended to make it possible for a user to play back DVD-Video disks without having to perform a selection operation on a menu even in a case in which a playback control sequence for a DVD-Video disk is defined by a provider of the DVD-Video disk such that a title menu defined in a VMGM-PGC such as that shown in FIG. 10A is displayed immediately after starting playback of the DVD-Video disk and after completion of the playback of the DVD-Video disk, thereby prompting a user to select a title to be played next.

Figure 23:
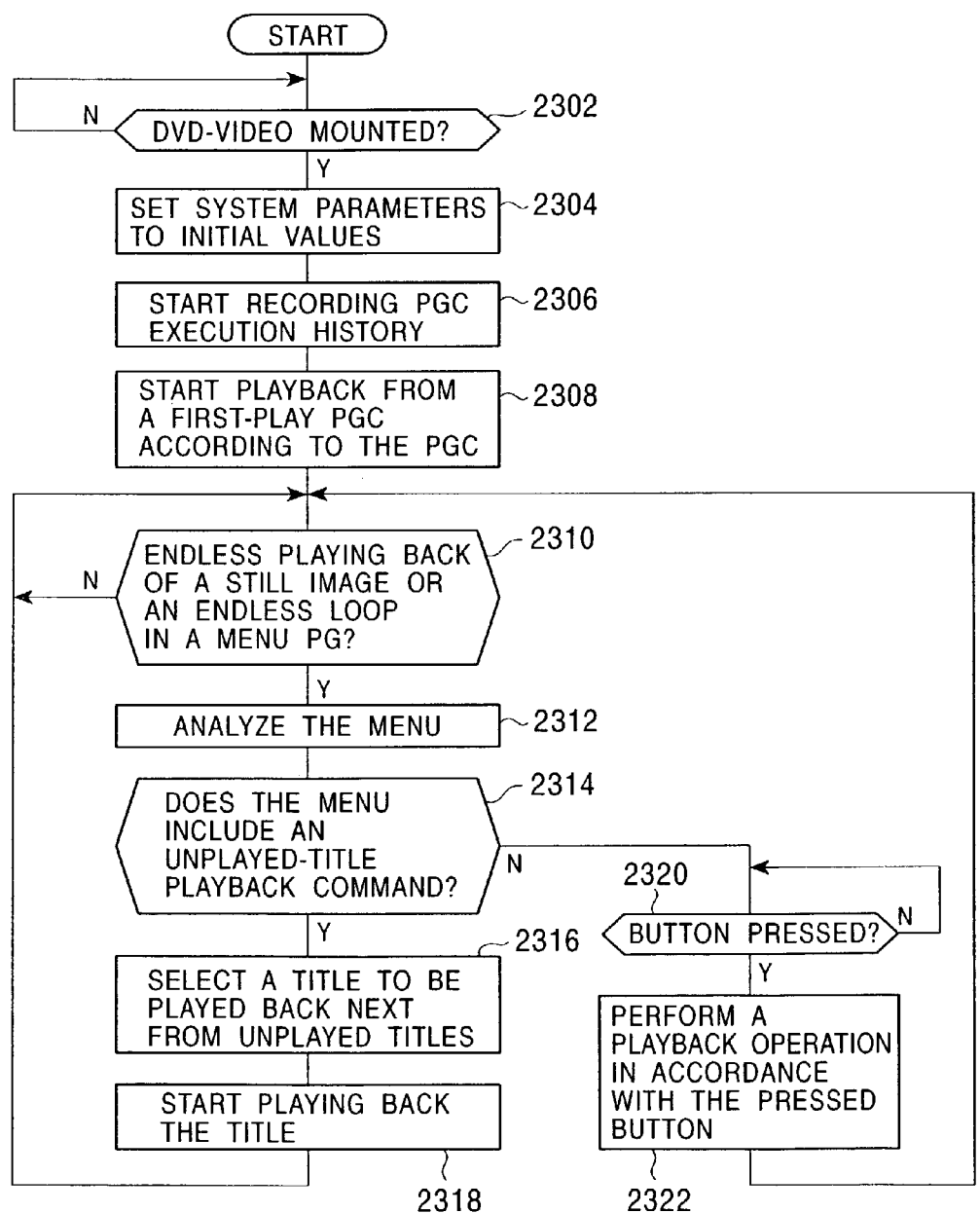
FIG. 23 is a flow chart showing a playback process performed by a DVD-Video player according to a sixth embodiment of the present invention.
Figure 24:
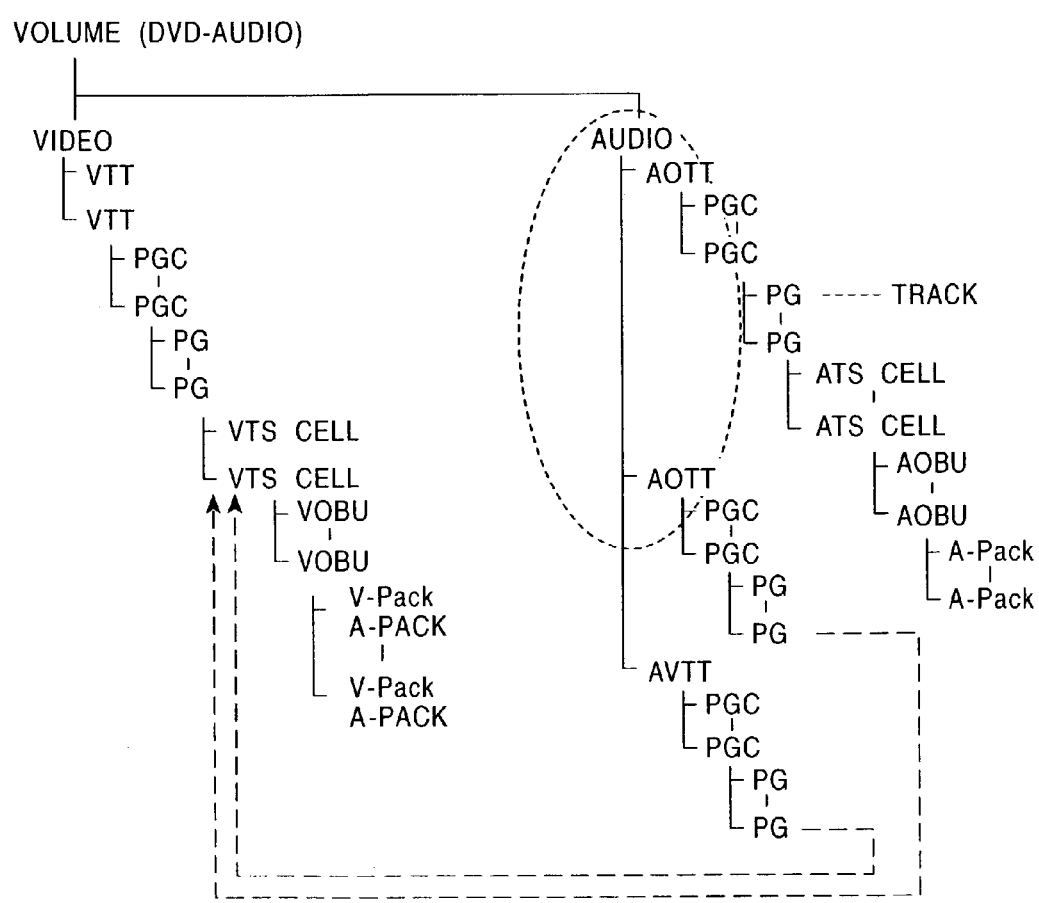
FIG. 24 is a diagram showing a data structure according to the DVD-Video standard.

In the sixth embodiment, the playback process performed by the presentation sequence control unit 321 of the DVD-Video player by controlling the navigation control unit 322 according to the fifth embodiment (FIG. 22) is replaced with a playback process shown in FIG. 23.

In the sixth embodiment, as shown in FIG. 23, if a DVD-Video disk 1 is mounted (step 2302), system parameters associated with a menu language code, a parental level, an angle number, an audio stream number, and the like are set to predetermined initial values (step 2304). Thereafter, recording of VTS-PGC execution history is started (step 2306), and playing of PGCs is started from a first-play PGC indicated by FP-PGCI in a VMGI-MAT (step 2308). Also in this sixth embodiment, the playback operation is performed by the presentation engine 33 in such a manner that not only audio data but full data including moving picture data and audio data is played.

The occurrence of an endless still mode or an endless loop of a PGC during playing of a VMGM-PGC is monitored (step 2310). If an endless still mode or an endless loop of a PGC occurs during the display of the VMGM-PGC, navigation commands for playing back titles described in BTN-CMD (6*d*) of PCI of a NV-pack of a VOBU of the VMGM-PGC are detected and analyzed in a similar manner as in the first embodiment (step 2312). In a case in which the detected navigation command includes no title playback navigation command or in a case in which although the detected navigation command includes a title navigation command, the title navigation command is for a title which has already been played back and is not for an unplayed title (step 2314), the process jumps to step 2320. If it is detected in step 2320 that a button is pressed by a user, a further playback operation is performed in the normal manner in accordance with the PGC. The process then returns to step 2310, and the occurrence of an endless still mode or an endless loop of a PGC during the playing of a VMGM-PGC is monitored.

If the detected navigation commands includes one or more navigation commands for playing back titles which have not been played yet, playback times of those unplayed titles are detected from PGC-PB-TM (9*b*) of PGC-GI of VTS-PGCI (8*i*) pointed to by VTS-PGCI-SRP# (4*k*), and a title having the longest playback time is selected as a title to be played next (step 2316). The navigation command for playing back the selected title is executed, thereby starting the playback of the selected title (step 2318). Thereafter, the process returns to step 2310, and the occurrence of an endless sill mode or an endless loop of a PGC during the playing of the VMGM-PGC is monitored.

The sixth embodiment of the present invention has been described above.

According to the fifth or sixth embodiment, it becomes possible to start playing a DVD-Video disk and sequentially play titles of the DVD-Video disk without requiring the display of a menu or the like or without requiring a selection operation on a menu by a user.

The techniques disclosed in the embodiments of the present invention can be applied not only to DVD-Video disks but also to storage media which include an arbitrary content stored therein and which need displaying of a menu or the like to start or continue playback.

What is claimed is:

1. A playback apparatus for playing back a storage medium on which a video content and menu information are stored, said video content including a set of playback data units each including audio data and moving picture data, and said menu information defining a menu intended to be displayed so as to prompt a user to select a playback data unit to be played back, said playback apparatus comprising:
a playback data unit selector for selecting a playback data unit to be played back from the playback data units stored on the storage medium, without receiving a selection command issued by a user in a situation in which the selection command is expected to be issued by the user; and
a player unit for playing back at least audio data of the selected playback data unit including audio data and moving picture data.

2. A playback apparatus for playing back a storage medium according to claim 1, wherein the playback data unit selector selects the playback data unit to be played back by extracting the menu information, analyzing the extracted menu information, and selecting a playback data unit to be played back from user-selectable playback data units included in the menu defined by the menu information.

3. A playback apparatus for playing back a storage medium according to claim 2, wherein in a case in which the menu information defining the displayed menu includes still information indicating that the menu should be endlessly displayed in the form of a still image unless a user operation on the menu is performed, the playback data unit selector analyzes the menu information defining the displayed menu and selects a playback data unit to be played back from user-selectable playback data units included in the menu defined by the menu information.

4. A playback apparatus for playing back a storage medium according to claim 2, wherein in a case in which the menu information defining the displayed menu includes loop information indicating that display of the menu should be endlessly repeated unless a user operation on the menu is performed, the playback data unit selector analyzes the menu information defining the displayed menu and selects a playback data unit to be played back from user-selectable playback data units included in the menu defined by the menu information.

5. A playback apparatus for playing back a storage medium according to claim 1, further comprising a playback order rule setting unit for setting a playback order rule as specified by a user into one of the following modes: a mode in which the playback data units are played in the same order as the order in which the playback data units are recorded; a mode in which the playback data units are played in order of increasing playback times; and a mode in which the playback data units are played in a random order,
wherein the playback data unit selector sequentially selects the playback data units to be played back according to the determined playback order rule.

6. A playback apparatus for playing back a storage medium according to claim 2, further comprising a playback order rule setting unit for setting a playback order rule as specified by a user into one of the following modes: a mode in which the playback data units are played in the same order as the order in which the playback data units are recorded; a mode in which the playback data units are played in order of increasing playback times; and a mode in which the playback data units are played in a random order,
wherein the playback data unit selector sequentially selects user-selectable playback data units included in a menu defined by the menu information as playback data units to be played back in accordance with the determined playback order rule.

7. A playback apparatus for playing back a storage medium according to claim 2, wherein
the storage medium is a DVD-Video disk;
the playback data unit selector selects the playback data units to be played back in such a manner that if a DVD-Video disk is mounted on the playback apparatus, title menu information defining a title menu intended to be displayed to prompt a user to select a title to be played is extracted as the menu information from the DVD-Video disk, the extracted title menu information is analyzed to detect titles selectable on the title menu by the user, and the detected titles are selected as the playback data units to be played back; and
the player unit performs the playback operation in such a manner that in a case in which a DVD-Audio disk is mounted on the playback apparatus, the player unit plays back audio data recorded on the mounted DVD-Audio disk, while in a case in which a DVD-Video disk is mounted on the playback apparatus, the player unit extracts audio data from the selected playback data units including audio data and moving picture data and plays back only the extracted audio data.

8. A playback apparatus for playing back a storage medium according to claim 2, wherein the storage medium is a DVD-Video disk;

the playback data unit selector selects the playback data units to be played back in such a manner that if a DVD-Video disk is mounted on the playback apparatus, part-of-title menu information defining a part-of-title menu intended to be displayed to prompt a user to select a chapter to be played is extracted as the menu information from the DVD-Video disk, the extracted part-of-title menu information is analyzed to detect chapters selectable on the part-of-title menu by the user, and the detected chapters are selected as the playback data units to be played back; and the player unit performs the playback operation in such a manner that in a case in which a DVD-Audio disk is mounted on the playback apparatus, the player unit plays back audio data recorded on the mounted DVD-Audio disk, while in a case in which a DVD-Video disk is mounted on the playback apparatus, the player unit extracts audio data from the selected playback data units including audio data and moving picture data and plays back only the extracted audio data.

9. A playback apparatus for playing back a storage medium according to claim 1, wherein the storage medium is a DVD-Video disk;

the playback data unit selector selects the playback data units to be played back in such a manner that when a DVD-Video disk is mounted on the playback apparatus, programs, program chains, parts of titles, or titles recorded on the DVD-Video disk are selected as the playback data units to be played back; and the player unit performs the playback operation in such a manner that in a case in which a DVD-Audio disk is mounted on the playback apparatus, the player unit plays back audio data recorded on the mounted DVD-Audio disk, while in a case in which a DVD-Video disk is mounted on the playback apparatus, the player unit extracts audio data from the selected playback data units including audio data and moving picture data and plays back only the extracted audio data.

10. A playback apparatus for playing back a storage medium according to claim 2, wherein the storage medium is a DVD-Video disk;

the playback data unit selector selects the playback data units to be played back in such a manner that if a DVD-Video disk is mounted on the playback apparatus, title menu information defining a title menu intended to be displayed to prompt a user to select a title to be played is extracted as the menu information from the DVD-Video disk, the extracted title menu information is analyzed to detect titles selectable on the title menu by the user, and the detected titles are selected as the playback data units to be played back; and the player unit performs the playback operation in such a manner that in a case in which a DVD-Video disk is mounted on the playback apparatus, the player unit plays back the selected playback data units.

11. A playback apparatus for playing back a storage medium according to claim 2, wherein the storage medium is a DVD-Video disk;

the playback data unit selector selects the playback data units to be played back in such a manner that if a DVD-Video disk is mounted on the playback apparatus, part-of-title menu information defining a part-of-title menu intended to be displayed to prompt a user to select a chapter to be played is extracted as the menu information from the DVD-Video disk, the extracted part-of-title menu information is analyzed to detect chapters selectable on the part-of-title menu by the user, and the detected chapters are selected as the playback data units to be played back; and the player unit performs the playback operation in such a manner that in a case in which a DVD-Video disk is mounted on the playback apparatus, the player unit plays back the selected playback data units.

12. A playback apparatus for playing back a storage medium according to claim 1, wherein the storage medium is a DVD-Video disk;

the playback data unit selector selects the playback data units to be played back in such a manner that when a DVD-Video disk is mounted on the playback apparatus, programs, program chains, parts of titles, or titles recorded on the DVD-Video disk are selected as the playback data units to be played back; and the player unit performs the playback operation in such a manner that in a case in which a DVD-Video disk is mounted on the playback apparatus, the player unit plays back the selected playback data units.

13. A DVD-Video player for use in a vehicle, comprising means for detecting whether or not the vehicle in which the DVD-Video player is installed is moving;

a video playback unit for playing back moving picture data and audio data of a video content including a set of playback segments recorded on a DVD-Video disk;

a no-display playback unit for sequentially selecting playback segments of the video content recorded on the DVD-Video disk and playing back audio data in the selected playback segments without playing back moving picture data in the selected playback segment; and control means for controlling the playback operation such that the video playback unit is responsible for the playback operation when the vehicle is at rest while the no-display playback unit is responsible for the playback operation when the vehicle is moving.

14. A method of playing back a storage medium on which video content and menu information are stored, said video content including a set of playback data units each including audio data and moving picture data, said menu information defining a menu intended to be displayed so as to prompt a user to select a playback data unit to be played back, said method comprising:

selecting a playback data unit to be played back from the playback data units stored on the storage medium, without receiving a selection command issued by a user in a situation in which the selection command is expected to be issued by the user; and playing back only audio data of the selected playback data unit including audio data and moving picture data;

wherein the selection of a playback data unit to be played back is made according to a determined playback order rule previously specified by the user.

15. A method of playing back a video content storage medium according to claim 14, wherein the selection act includes the acts of extracting the menu information, analyzing the extracted menu information, and selecting a playback data unit to be played back from user-selectable playback data units included in the menu defined by the menu information.

16. A method of playing back a video content storage medium according to claim 15, wherein in a case in which the menu information defining the displayed menu includes playback control information indicating that when the menu is displayed, the playback operation should not further proceed unless a user operation is performed, the selection act analyzes the menu information defining the displayed menu and selects a playback data unit to be played back from user-selectable playback data units included in the menu defined by the menu information.

17. A computer-readable storage medium having a program stored thereon for causing a computer to execute a process of playing back a storage medium on which a video content and menu information are stored, said video content including a set of playback data units each including audio data and moving picture data, and said menu information defining a menu intended to be displayed so as to prompt a user to select a playback data unit to be played back, said processing comprising the acts of:

selecting a playback data unit to be played back from the playback data units stored on the storage medium, without receiving a selection command issued by a user in a situation in which the selection command is expected to be issued by the user; and playing back at least audio data of the selected playback data unit including audio data and moving picture data.

18. A computer-readable storage medium according to claim 17, wherein the selection act includes the acts of extracting the menu information, analyzing the extracted menu information, and selecting a playback data unit to be played back from user-selectable playback data units included in the menu defined by the menu information.

19. A computer-readable storage medium according to claim 17, wherein in a case in which the menu information defining the displayed menu includes playback control information indicating that when the menu is displayed, the playback operation should not further proceed unless a user operation is performed, the selection step analyzes the menu information defining the displayed menu and selects a playback data unit to be played back from user-selectable playback data units included in the menu defined by the menu information.

\* \* \* \* \*

UNITED STATES PATENT AND TRADEMARK OFFICE
CERTIFICATE OF CORRECTION

PATENT NO. : 7,362,956 B2
APPLICATION NO. : 10/393446
DATED : April 22, 2008
INVENTOR(S) : Koji Akita et al.

It is certified that error appears in the above-identified patent and that said Letters Patent is hereby corrected as shown below:

Column 25, in claim 1, line 14, after "playing back" delete "at least" and substitute --only-- in its place.

Columns 29-30, in claim 17, line 15, after "playing back" delete "at least" and substitute --only-- in its place.

Column 30, in claim 19, line 6, after "the selection" delete "step" and substitute --act-- in its place.

Signed and Sealed this

Second Day of September, 2008

JON W. DUDAS
*Director of the United States Patent and Trademark Office*